US011272163B2

(12) United States Patent
Uemori

(10) Patent No.: US 11,272,163 B2
(45) Date of Patent: Mar. 8, 2022

(54) IMAGE PROCESSING APPARATUS AND IMAGE PROCESSING METHOD

(71) Applicant: SONY CORPORATION, Tokyo (JP)

(72) Inventor: Takeshi Uemori, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/474,946

(22) PCT Filed: Jan. 22, 2018

(86) PCT No.: PCT/JP2018/001782
§ 371 (c)(1),
(2) Date: Jun. 28, 2019

(87) PCT Pub. No.: WO2018/147059
PCT Pub. Date: Aug. 16, 2018

(65) Prior Publication Data
US 2019/0349572 A1 Nov. 14, 2019

(30) Foreign Application Priority Data

Feb. 7, 2017 (JP) .............................. JP2017-020055

(51) Int. Cl.
*H04N 13/271* (2018.01)
*G06T 7/593* (2017.01)
(Continued)

(52) U.S. Cl.
CPC ......... *H04N 13/271* (2018.05); *G06K 9/4609* (2013.01); *G06K 9/6267* (2013.01);
(Continued)

(58) Field of Classification Search
CPC .... H04N 13/271; H04N 13/279; G06T 7/593; G06T 5/20; G06T 2207/10024; G06T 2207/10048; G06K 9/4609; G06K 9/6267
(Continued)

(56) References Cited

U.S. PATENT DOCUMENTS 5,504,847 A 4/1996 Kimura et al.
9,485,495 B2 * 11/2016 Atanassov ........... H04N 13/239
(Continued)

FOREIGN PATENT DOCUMENTS

CN 103139469 A 6/2013
DE 69328230 T2 8/2000
(Continued)

OTHER PUBLICATIONS

International Search Report and Written Opinion of PCT Application No. PCT/JP2018/001782, dated Apr. 10, 2018, 09 pages of ISRWO.
(Continued)

*Primary Examiner* — Daniel G Mariam
(74) *Attorney, Agent, or Firm* — Chip Law Group

(57) ABSTRACT

Provided are an apparatus and a method for executing generation of a disparity map and an object detection process with high accuracy and efficiency. The apparatus includes a disparity calculation unit that receives two images captured from different viewpoints, calculates a disparity, and generates a disparity map and a classification unit that performs the object detection process using the disparity map. The disparity calculation unit performs a stereo matching process using an original-resolution image, generates cost volumes corresponding to a plurality of resolutions from the processing result, generates disparity maps and object candidate region maps corresponding to a plurality of different resolutions, using the cost volumes corresponding to each resolution, and outputs the disparity maps and the object candidate region maps to the classification unit.

12 Claims, 20 Drawing Sheets

(51) Int. Cl.
  H04N 13/279 (2018.01)
  G06K 9/46 (2006.01)
  G06K 9/62 (2022.01)
  G06T 5/20 (2006.01)

(52) U.S. Cl.
  CPC ............... *G06T 5/20* (2013.01); *G06T 7/593* (2017.01); *H04N 13/279* (2018.05); *G06T 2207/10024* (2013.01); *G06T 2207/10048* (2013.01)

(58) Field of Classification Search
  USPC .......................................................... 382/154
  See application file for complete search history.

(56) References Cited

U.S. PATENT DOCUMENTS

| | | | |
|---|---|---|---|
| 9,626,590 B2* | 4/2017 | Najafi Shoushtari | ........................ G06K 9/6201 |
| 10,321,112 B2* | 6/2019 | Aflalo | ...................... G06T 7/593 |
| 2008/0036576 A1* | 2/2008 | Stein | ...................... G08G 1/167 340/425.5 |
| 2009/0141938 A1* | 6/2009 | Lim | ................... G06K 9/00664 382/103 |
| 2010/0128974 A1* | 5/2010 | Koizumi | ................. G06T 7/593 382/154 |
| 2013/0142415 A1 | 6/2013 | Ali et al. | |
| 2015/0036917 A1* | 2/2015 | Nanri | ...................... G06T 7/593 382/154 |
| 2015/0078669 A1* | 3/2015 | Ukil | ................... G06K 9/00234 382/201 |
| 2015/0249814 A1* | 9/2015 | Nanri | ................... G01B 11/026 348/46 |
| 2015/0302239 A1 | 10/2015 | Ohba et al. | |
| 2015/0302596 A1 | 10/2015 | Mizukami et al. | |
| 2015/0324659 A1* | 11/2015 | Liu | ...................... G06K 9/3241 382/197 |
| 2016/0044297 A1 | 2/2016 | Segawa et al. | |
| 2016/0284090 A1* | 9/2016 | Huang | ................... G06T 7/593 |

FOREIGN PATENT DOCUMENTS

| | | |
|---|---|---|
| EP | 0600709 A2 | 6/1994 |
| EP | 2600618 A2 | 6/2013 |
| JP | 06-176107 A | 6/1994 |
| JP | 2011-048416 A | 3/2011 |
| JP | 2013-117969 A | 6/2013 |
| JP | 2014-096062 A | 5/2014 |
| JP | 2014-106732 A | 6/2014 |
| JP | 2016-038886 A | 3/2016 |
| KR | 10-2013-0061636 A | 6/2013 |
| TW | 201338500 A | 9/2013 |
| WO | 2014/073670 A1 | 5/2014 |
| WO | 2014/083721 A1 | 6/2014 |

OTHER PUBLICATIONS

Uto, et al., "Fast Registration Algorithms of Range Images Based on Multiresolution Analysis", IEICE Technical Report, vol. 105, No. 177, Jul. 8, 2005.

Office Action for JP Patent Application No. 2018-567346, dated Nov. 16, 2021, 04 pages of English Translation and 04 pages of Office Action.

Uto, et al., "Fast Registration Algorithms of Range Images Based on Multi resolution Analysis", IEICE Technical Report, Japan, Institute of Electronics, Information and Communication Engineers, vol. 105, No. 177, Jul. 8, 2005, pp. 33-38.

* cited by examiner

FIG. 2B  Far-infrared image

FIG. 2A  Visible image

IMAGE PROCESSING APPARATUS AND IMAGE PROCESSING METHOD

CROSS REFERENCE TO RELATED APPLICATIONS

This application is a U.S. National Phase of International Patent Application No. PCT/JP2018/001782 filed on Jan. 22, 2018, which claims priority benefit of Japanese Patent Application No. JP 2017-020055 filed in the Japan Patent Office on Feb. 7, 2017. Each of the above-referenced applications is hereby incorporated herein by reference in its entirety.

TECHNICAL FIELD

The present disclosure relates to an image processing apparatus, an image processing method, and a program. In particular, the present disclosure relates to an image processing apparatus, an image processing method, and a program which are capable of improving the accuracy of stereo matching using images captured from two different viewpoints to detect an object with high accuracy.

BACKGROUND ART

In recent years, a system has been widely used in which a visible camera that captures a visible image and a far-infrared camera capable of capturing, for example, an image of a person even at night when it is difficult to capture images with visible light are combined.

For example, a visible camera and a far-infrared camera are provided side by side as in-vehicle cameras and stereo matching based on images captured by the two cameras is performed, which makes it possible to detect a person and to measure the distance to the person.

For example, Non-Patent Literature 1 [Multispectral Pedestrian Detection: Benchmark Dataset and Baseline (CVPR2015_MutispectalPedestrian.pdf)] discloses a pedestrian detection process using a visible image and a far-infrared image.

Non-Patent Literature 1 discloses a configuration that learns feature amounts, such as the brightness, color, and gradient (strength and a direction) of a visible image (RGB image), and feature amounts related to the temperature and gradient (strength and a direction) of a far-infrared image, using machine learning, to detect a pedestrian. The application of the disclosed method makes it possible to detect a pedestrian even in a scene in which it is difficult to capture visible images, such as at night.

As such, in a case in which image processing is performed for a general visible image, using other sensor information, it is possible to detect a person even in a situation in which it is difficult to detect a person using only the visible image, such as at night.

However, in object detection using images with different wavelengths, in a case in which there is a positional deviation between two images, the accuracy and performance of the object detection are likely to be reduced.

In Non-Patent Literature 1, a beam splitter is used to align the optical axes of the visible camera and the far-infrared camera. In this case, the size of the apparatus increases, which results in an increase in cost.

In addition, in some cases, it is difficult to physically align the optical axes due to, for example, a combination of the two cameras and restrictions in the installation position.

In addition to the physical method, there is a method which performs signal processing for image signals captured by two cameras to align the optical axes of the two cameras.

For example, there is a method which performs calibration in advance, using a chart, to correct the amount of deviation of each pixel using stereo matching for the disparity caused by the positional relationship between a target object and a camera at the time of actual imaging.

However, the stereo matching has a problem of how to set a block size and a search range to be applied to block matching.

In a case in which the block size is too small, robustness to noise is reduced and the result of disparity estimation is unstable. In contrast, in a case in which the block size is too large, the disparities of the foreground and the background are mixed at the object boundary, which results in a reduction in the accuracy of disparity estimation.

In addition, in a case in which the search range is too narrow, the range in which the disparity can be detected is narrowed and scenes capable of responding to the narrowing of the range are limited. In contrast, in a case in which the search range is too wide, the number of candidates increases and the number of errors in estimation increases. In addition, the processing time increases.

In a case in which the block size and the search range of block matching can be set appropriately, it is possible to improve the performance and to reduce the amount of calculation. However, the current situation is that there is no clear answer for a specific optimization process.

Further, another problem of the object detection technique is a large amount of calculation.

In general, in the object detection, it is difficult to known in advance the position of the object to be detected on the image and the size of the object on the image. Therefore, a plurality of images which has been enlarged or reduced to various sizes and has different resolutions is generated and a detection process is performed for the entire range of each of the plurality of images. Since this process is required, there is a problem that the amount of calculation increases.

CITATION LIST

Non-Patent Literature

Non-Patent Literature 1: Multispectral Pedestrian Detection: Benchmark Dataset and Baseline (CVPR2015_MutispectalPedestrian.pdf)

SUMMARY OF INVENTION

Technical Problem

The present disclosure has been made in view of, for example, the above-mentioned problems and an object of the present disclosure is to provide an image processing apparatus, an image processing method, and a program which are capable of executing generation of a disparity map using images captured from two different viewpoints and an object detection process with high accuracy and efficiency.

An object of an embodiment of the present disclosure is to provide an image processing apparatus, an image processing method, and a program which are capable of executing, for example, stereo matching, generation of a disparity map, and an object detection process with high accuracy and efficiency in image processing using a visible image and a far-infrared image.

Solution to Problem

In accordance with a first aspect of the present disclosure, there is provided an image processing apparatus including an object detection unit that receives two images captured from different viewpoints and performs an object detection process. The object detection unit includes a disparity calculation unit that calculates a disparity of each pixel of the two images and generates a disparity map including calculated disparity information, and a classification unit that performs the object detection process using the disparity map generated by the disparity calculation unit. The disparity calculation unit generates disparity maps corresponding to a plurality of different resolutions and outputs the disparity maps to the classification unit.

In addition, in accordance with a second aspect of the present disclosure, there is provided an image processing method to be executed in an image processing apparatus. The image processing method includes an object detection processing step of allowing an object detection unit to receive two images captured from different viewpoints and to perform an object detection process. The object detection processing step includes a disparity calculation step of allowing a disparity calculation unit to calculate a disparity of each pixel of the two images and to generate a disparity map including calculated disparity information, and a classification processing step of allowing a classification unit to perform the object detection process using the disparity map generated in the disparity calculation step. In the disparity calculation step, disparity maps corresponding to a plurality of different resolutions are generated and output to the classification unit.

Further, in accordance with a third aspect of the present disclosure, there is provided a program that causes image processing to be executed in an image processing apparatus. The program causes an object detection unit to execute an object detection processing step of receiving two images captured from different viewpoints and executing an object detection process. In the object detection processing step, the program causes a disparity calculation unit to execute a disparity calculation step of calculating a disparity of each pixel of the two images and generating a disparity map including calculated disparity information and causes a classification unit to execute a classification processing step of performing the object detection process using the disparity map generated in the disparity calculation step. In the disparity calculation step, disparity maps corresponding to a plurality of different resolutions are generated and output to the classification unit.

It should be noted that, for example, the program according to the present disclosure can be provided by a storage medium or a communication medium which is provided in a computer-readable form to an information processing apparatus or a computer system capable of executing various program codes. Since the program is provided in a computer readable form, processes corresponding to the program are implemented in the information processing apparatus or the computer system.

Other objects, features, and advantages of the present disclosure will become apparent from the more detailed description based on the embodiments of the present disclosure which will be described below and the accompanying drawings. It should be noted that, in the specification, a system is a logical set configuration of a plurality of apparatuses and is not limited to the configuration in which the apparatuses are provided in the same housing.

Advantageous Effects of Invention

In accordance with the configuration of an embodiment of the present disclosure, an apparatus and a method that perform generation of a disparity map and an object detection process with high accuracy and efficiency are achieved.

Specifically, for example, the apparatus includes a disparity calculation unit that receives two images captured from different viewpoints, calculates a disparity, and generates a disparity map and a classification unit that performs an object detection process using the disparity map. The disparity calculation unit performs a stereo matching process using an original-resolution image, generates cost volumes corresponding to a plurality of resolutions from the processing result, generates disparity maps and object candidate region maps corresponding to the plurality of different resolutions, using the cost volumes corresponding to each resolution, and outputs the disparity maps and the object candidate region maps to the classification unit.

The apparatus and the method that perform the generation of the disparity map and the object detection process with high accuracy and efficiency are achieved by these processes.

It should be noted that the effects described in the specification are just illustrative and are not limited and additional effects may be obtained.

BRIEF DESCRIPTION OF DRAWINGS

FIGS. 2A and 2B are diagrams illustrating an example of the arrangement of pixels in a visible image and a far-infrared image.

MODE(S) FOR CARRYING OUT THE INVENTION

Hereinafter, an image processing apparatus, an imaging apparatus, an image processing method, and an image processing program according to the present disclosure will be described in detail with reference to the drawings. It should be noted that the description will be made in accordance with the following items.

1. For Configuration and Process of Image Processing Apparatus According to Present Disclosure 2. For Configuration and Process of Image Processing Unit 3. For Configuration and Process of Disparity Calculation Unit
   3-1. For Process Performed by Pixel Matching Unit
   3-2. For Process Performed by Cost Volume Filtering Unit
   3-3. For Process Performed by Disparity Decision Unit
4. Other Embodiments
   4-1. For Modification Example of Similarity Calculation Process of Pixel Matching Unit
   4-2. For Modification Example of Cost Volume Filtering Process of Cost Volume Filtering Unit
   4-3. For Modification Example of Disparity Decision Process of Disparity Decision Unit
   4-4. For Modification Example of Object Candidate Region Map Generation Process of Disparity Decision Unit
5. For Example of Hardware Configuration of Image Processing Apparatus
6. For Summary of Configuration of Present Disclosure

1. For Configuration and Process of Image Processing Apparatus According to Present Disclosure The configuration and process of an image processing apparatus according to the present disclosure will be described with reference to FIG. 1 and the subsequent figures.

First, an image to be processed by the image processing apparatus according to the present disclosure will be described with reference to FIG. 1 and the subsequent figures.

The image processing apparatus according to the present disclosure performs image processing for images captured from two different viewpoints.

It should be noted that an embodiment in which a visible image and a far-infrared image are applied as a combination of images captured from two different viewpoints will be described below.

That is, an example in which a visible image and a far-infrared image which are the images captured from two different viewpoints are input and image processing is performed for these images will be described.

However, the process according to the present disclosure is not limited to the combination of the visible image and the far-infrared image and may be applied to combinations of other images, such as, a combination of a visible image and an infrared image and a combination of a visible image and a visible light image. That is, the process may be applied to any combination of images captured from two different viewpoints.

Figure 1:
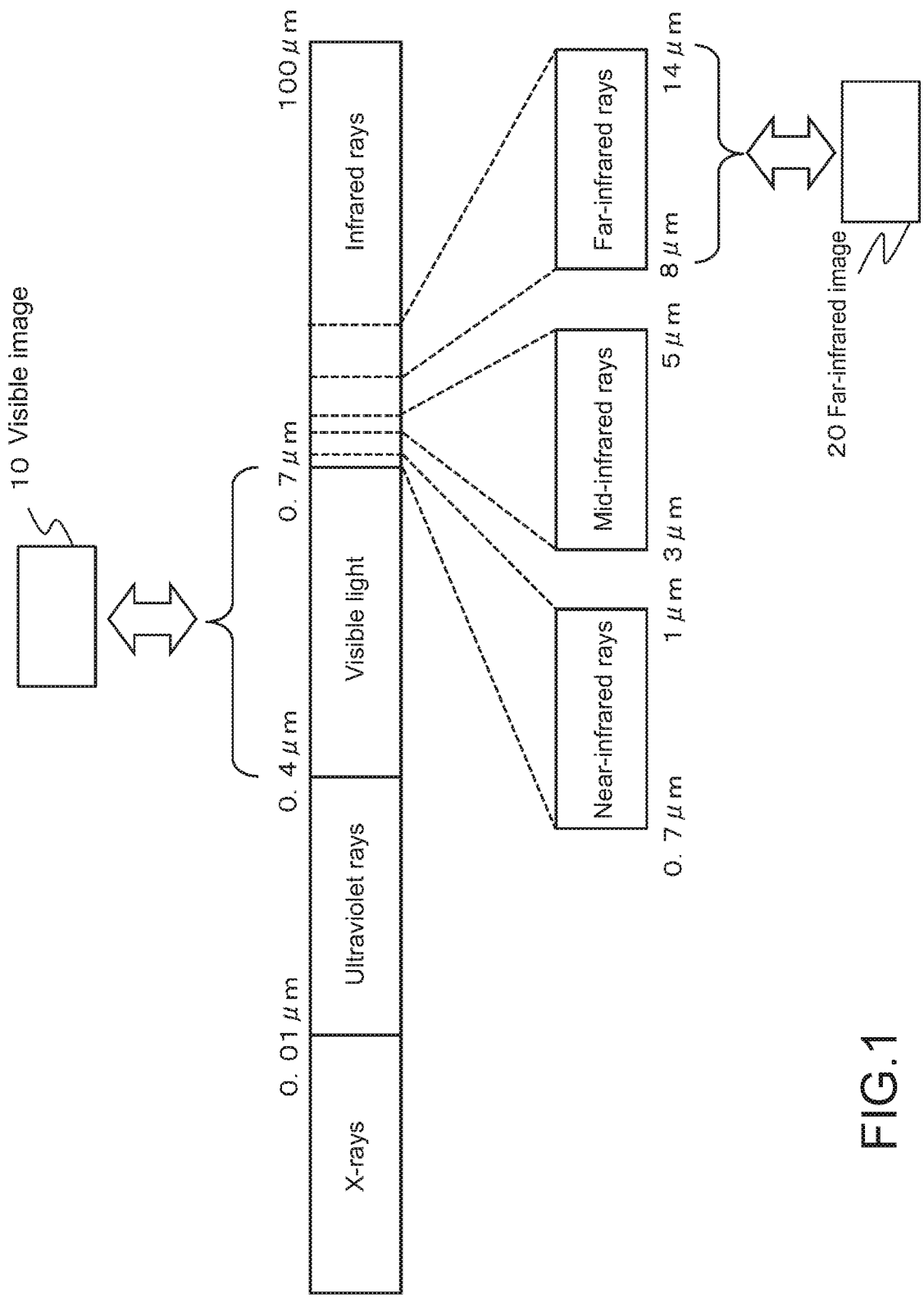
FIG. 1 is a diagram illustrating a correspondence relationship between the type of captured image and the wavelength of light.

As illustrated in FIG. 1, a visible image 10 is an image in a wavelength range of about 0.4 μm to 0.7 μm and is a color image such as an RGB image captured by a general camera.

The infrared image is an image formed by long-wavelength light with a wavelength of 0.7 μm or more. An infrared imaging camera that captures infrared images can capture an image of an object, such as a person, that generates heat in the dark and is used as, for example, a surveillance camera.

It should be noted that infrared rays are divided into near-infrared rays with a wavelength of about 0.7 μm to 1 μm, mid-infrared rays with a wavelength of about 3 μm to 5 μm, and far-infrared rays with a wavelength of about 8 μm to 14 μm as illustrated in FIG. 1.

In the embodiment described below, an example of image processing using a far-infrared image 20 obtained by capturing far-infrared rays with a wavelength of about 8 μm to 14 μm will be mainly described.

However, the process according to the present disclosure is not limited to the far-infrared image and may be applied to processes using other infrared images.

Figures 2A, 2B:
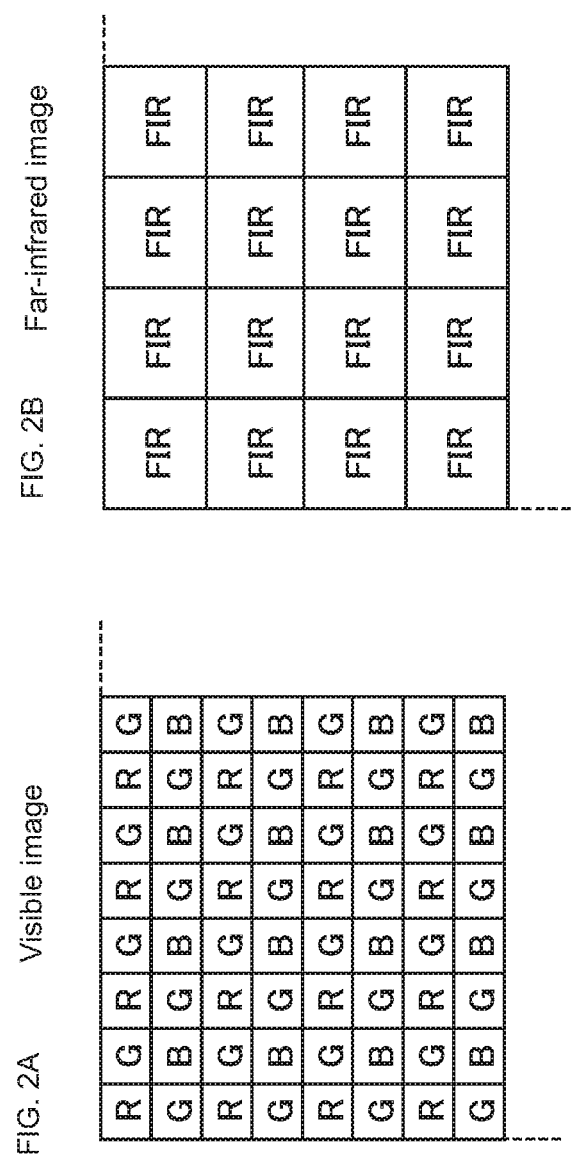

FIGS. 2A and 2B are diagrams illustrating an example of the arrangement of pixels on an imaging element that captures the visible image 10 and the far-infrared image 20.

The visible image illustrated in FIG. 2A shows an example of a Bayer array of R, G, and B pixels. The Bayer array is used for imaging elements of many visible imaging cameras.

Each pixel of the imaging element outputs an electric signal corresponding to the amount of light with R, G, or B wavelengths.

In contrast, the far-infrared image illustrated in FIG. 2B is obtained by capturing light with a far-infrared (FIR) wavelength at all pixel positions.

Specifically, for example, a monochrome image formed by grayscale pixel values corresponding to the temperature, such as the body temperature of a person, is generated.

As illustrated in FIG. 2A and FIG. 2B, in general, an infrared imaging element has a lower resolution than a visible imaging element. The reason is that infrared light, particularly, far-infrared light has a long wavelength and it is difficult for an imaging element having a high-density pixel array to use infrared light.

Figure 3:
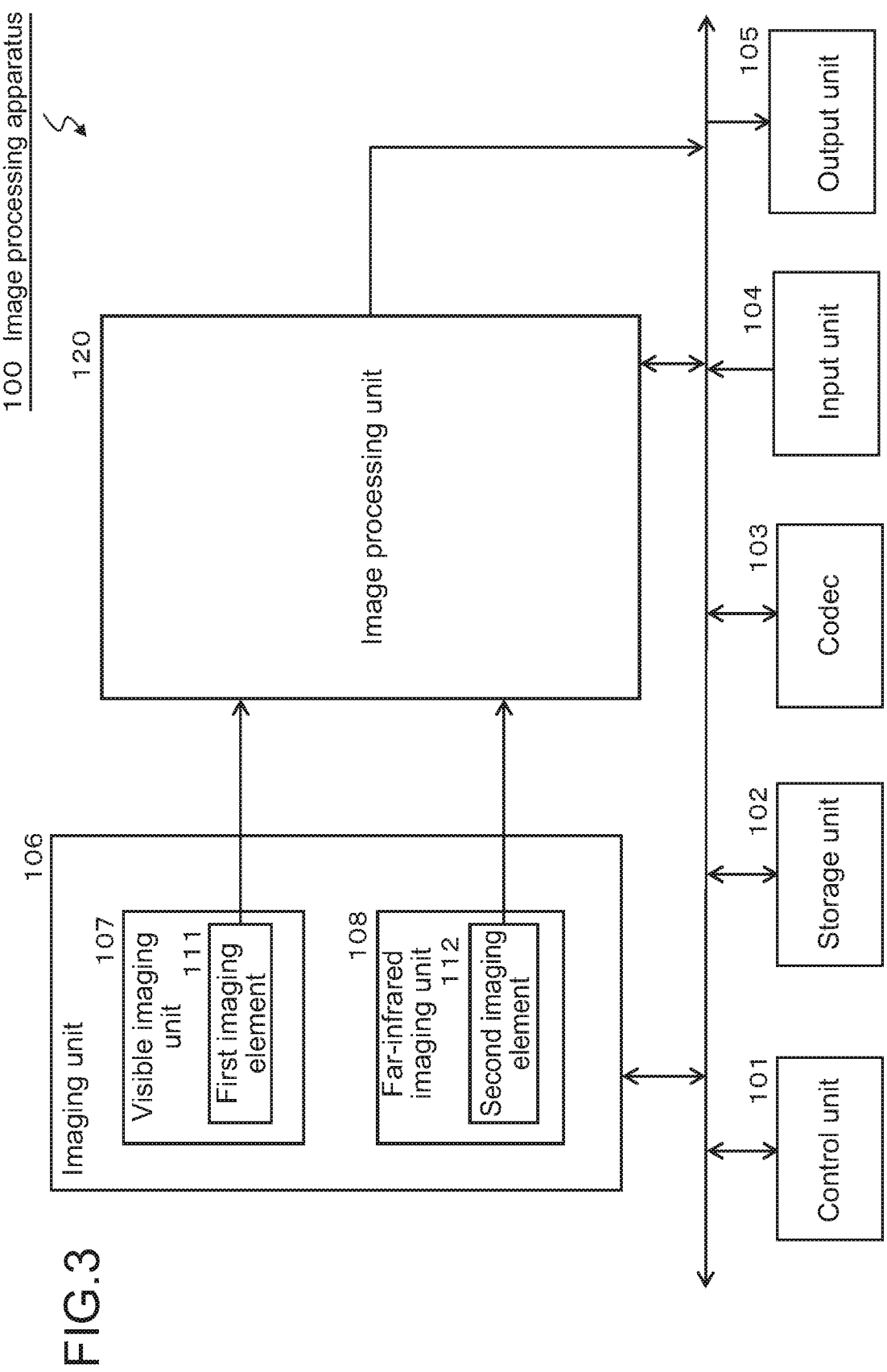
FIG. 3 is a diagram illustrating an example of the configuration of an image processing apparatus according to the present disclosure.

FIG. 3 is a block diagram illustrating the configuration of an imaging apparatus which is an example of an image processing apparatus 100 according to the present disclosure.

It should be noted that the image processing apparatus according to the present disclosure is not limited to the imaging apparatus and also includes an information processing apparatus such as a PC that receives an image captured by the imaging apparatus and performs image processing.

Hereinafter, the configuration and process of the imaging apparatus as an example of the image processing apparatus 100 according to the present disclosure will be described.

Image processing other than the imaging process described in the following embodiment can be performed not only in the imaging apparatus, but also in the information processing apparatus such as a PC.

The image processing apparatus 100 as the imaging apparatus illustrated in FIG. 3 includes a control unit 101, a storage unit 102, a codec 103, an input unit 104, an output unit 105, an imaging unit 106, and an image processing unit 120.

The imaging unit 106 includes a visible imaging unit 107 that captures a general a visible image and an infrared imaging unit 108 that captures a far-infrared image.

It should be noted that, as described above, the process according to the present disclosure can be applied not only to a combination of a visible image and a far-infrared image, but also to combinations of other images, such as a combination of a visible image and an infrared image and a combination of a visible image and a visible image.

Next, an embodiment of the present disclosure in which a visible image and a far-infrared image are applied will be described.

The visible imaging unit 107 includes a first imaging element 111 that captures a visible image. The first imaging element 111 includes, for example, R, G and B pixels that are arranged in the Bayer array described with reference to FIG. 2A and each pixel outputs a signal corresponding to input light of each of R, G, and B.

In contrast, the far-infrared imaging unit 108 includes a second imaging element 112 that captures a far-infrared image. The second imaging element 112 includes, for example, pixels on which far-infrared light is incident as described with reference to FIG. 2B. Each pixel outputs an electric signal corresponding to the amount of incident far-infrared light.

The visible imaging unit 107 and the infrared imaging unit 108 are two imaging units set at positions that are a predetermined distance away from each other and capture images from different viewpoints.

The same object image is not captured by the corresponding pixels, that is, the pixels at the same position in two images captured from different viewpoints and object deviation corresponding to disparity occurs.

In a case in which the captured images are still images, each of the visible imaging unit 107 and the infrared imaging unit 108 captures one still image. That is, a total of two still images are captured. In a case in which a moving image is captured, each of the imaging units captures continuous image frames.

It should be noted that the control unit 101 controls the imaging timing of the imaging units.

The control unit 101 controls various processes of the imaging apparatus 100, such as an imaging process, signal processing for a captured image, an image recording process, and a display process. The control unit 101 includes, for example, a CPU that performs processes according to various processing programs stored in the storage unit 102 and functions as a data processing unit that executes programs.

The storage unit 102 is, for example, a RAM or a ROM that functions as a captured image storage unit, a storage unit storing processing programs executed by the control unit 101 or various parameters, and a work area at the time of data processing.

The codec 103 performs a coding and decoding process such as a process of compressing and decompressing a captured image.

The input unit 104 is, for example, a user operation unit and is used to input control information such as information related to the start and end of imaging and the setting of various modes.

For example, the output unit 105 includes a display unit and a speaker and is used to display captured images and through images and to output voice.

The image processing unit 120 receives two images captured by the imaging unit 106 and performs image processing using the two images.

A specific example of the image processing will be described below in each of the following embodiments.

2. For Configuration and Process of Image Processing Unit

Next, the specific configuration and process of the image processing unit 120 in the image processing apparatus 100 described with reference to FIG. 3 will be described.

Figure 4:
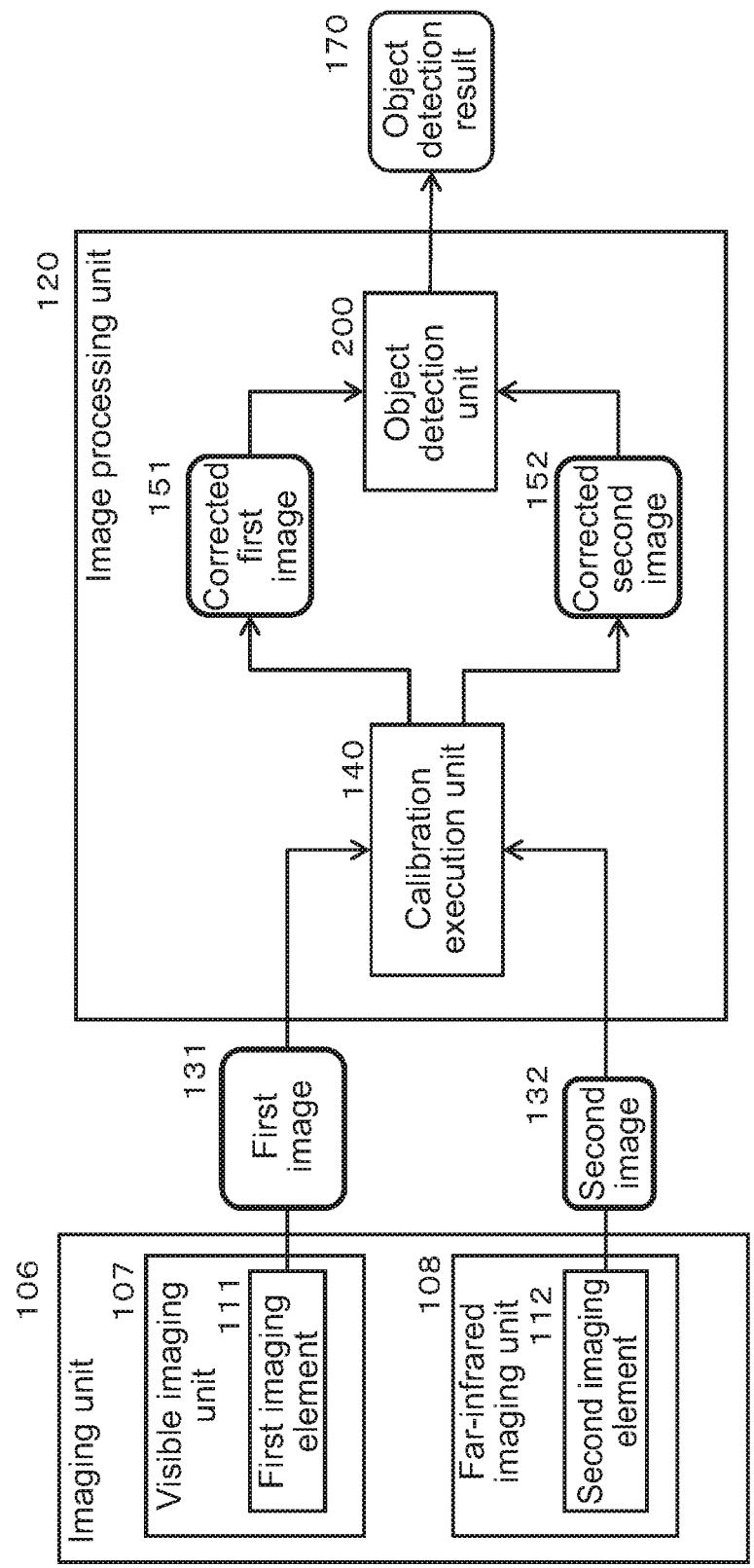
FIG. 4 is a diagram illustrating the configuration and process of an image processing unit.

FIG. 4 is a block diagram illustrating a specific configuration of the image processing unit 120 in the image processing apparatus 100 described with reference to FIG. 3.

As illustrated in FIG. 4, the image processing unit 120 includes a calibration execution unit 140 and an object detection unit 200.

The calibration execution unit 140 receives a first image 131 which is a visible image captured by the first imaging element 111 of the visible imaging unit 107 in the imaging unit 106 and a second image 132 which is a far-infrared image captured by the second imaging element 112 of the far-infrared imaging unit 108 and performs a calibration process to generate a corrected first image 151 and a corrected second image 152.

The visible imaging unit 107 and the far-infrared imaging unit 108 in the imaging unit 106 are provided at the positions that are separated from each other and there is a difference between parameters of lenses forming the imaging units.

Therefore, the first image 131 captured by the visible imaging unit 107 and the second image 132 captured by the far-infrared imaging unit 108 are different in characteristics such as distortion, magnification, and resolution.

Therefore, first, the calibration execution unit 140 performs a distortion correction process and a magnification correction process for each of the first image 131 and the second image 132. In addition, a parallelization process is performed for the images in order to facilitate a stereo matching process to be performed in the subsequent stage. In a case in which one point in a three-dimensional space is projected onto each image, the point is aligned on the same line of each image by the parallelization process. However, disparity in the horizontal direction occurs in accordance with the distance between the camera and one point in the three-dimensional space.

The corrected first image 151 and the corrected second image 152 which are images calibrated by the calibration execution unit 140 are input to the object detection unit 200.

The object detection unit 200 performs an object detection process, for example, a person detection process using the corrected first image 151 and the corrected second image 152 after the calibration.

The object detection unit 200 outputs an object detection result 170 as the processing result. For example, the processing result is the detection result of a person.

An example of the configuration and process of the object detection unit 200 will be described with reference to FIG. 5.

Figure 5:
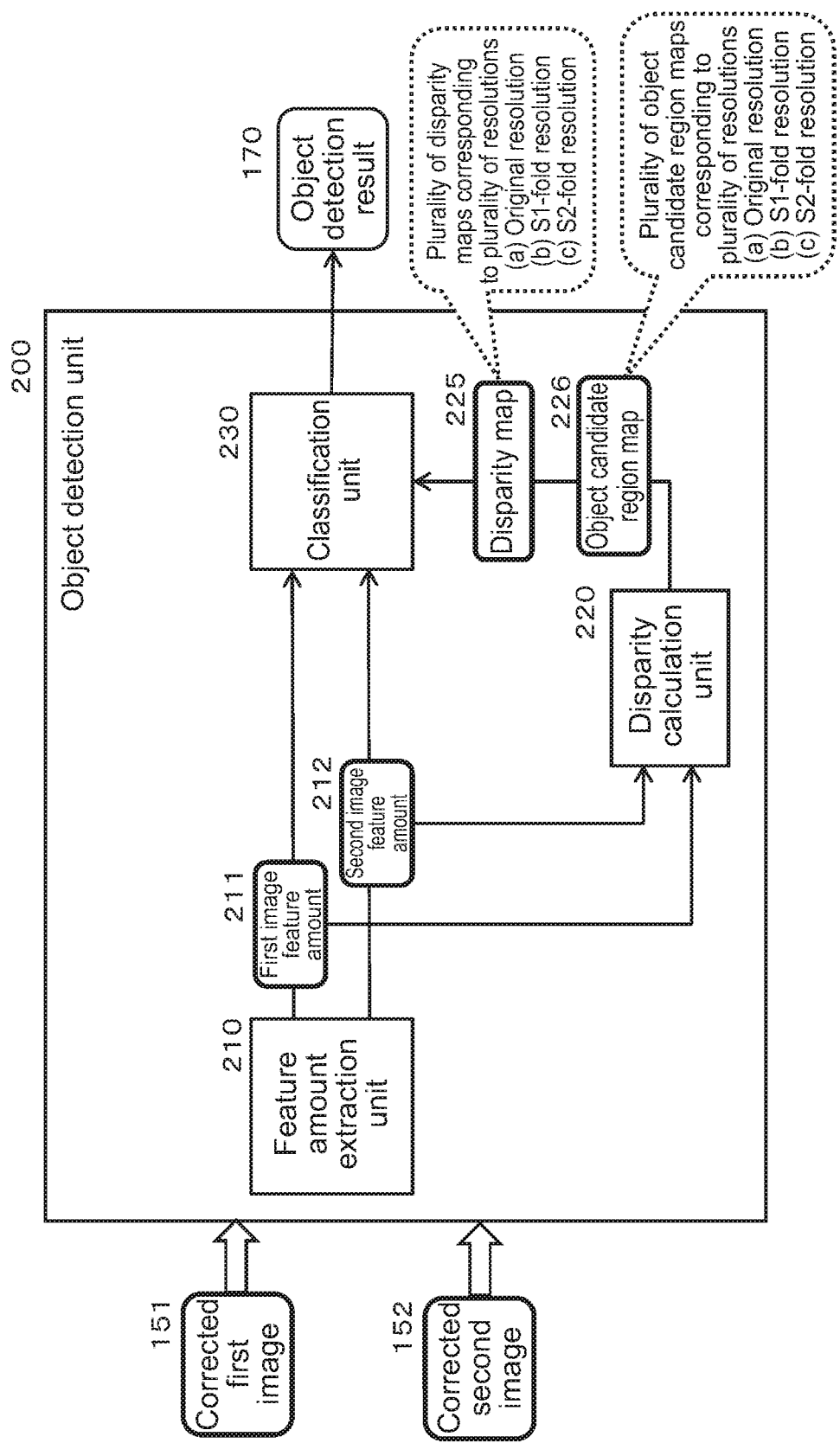
FIG. 5 is a diagram illustrating the configuration and process of an object detection unit.

As illustrated in FIG. 5, the object detection unit 200 includes a feature amount extraction unit 210, a disparity calculation unit 220, and a classification unit 230.

Each of the feature amount extraction unit 210, the disparity calculation unit 220, and the classification unit 230 of the object detection unit 200 receives the corrected first image 151 and the corrected second image 152 after the calibration and performs processes.

The feature amount extraction unit 210 receives the corrected first image 151 and the corrected second image 152 after the calibration and extracts feature amounts from each of the images.

The extracted feature amounts are feature amounts corresponding to the images.

For example, brightness, color information, and gradient information are extracted from the corrected first image 151 which is a visible image.

In addition, for example, temperature and gradient information are extracted from the corrected second image 152 which is a far-infrared image.

As described above, the far-infrared image is, for example, a monochrome image formed by grayscale pixel values corresponding to the temperature such as the human body temperature. For example, the temperature indicated by the pixel value of the monochrome image and the gradient information of the pixel value are extracted as the feature amounts.

As illustrated in FIG. 5, the feature amount extraction unit 210 outputs each of the following feature amount data items:

(a) A first image feature amount 211 extracted from the corrected first image 151 which is a visible image; and (b) A second image feature amount 212 extracted from the corrected second image 152 which is a far-infrared image.

The feature amount information items are input to the disparity calculation unit 220 and the classification unit 230.

The disparity calculation unit 220 generates a disparity map 225, in which the disparity information of the corrected first image 151 and the corrected second image 152 has been reflected, using the feature amounts of two images.

The disparity map is, for example, a map indicating the positional deviation d (pixels) of a corresponding pixel of the corrected second image 152 from each pixel (x, y) forming the corrected first image 151.

The position of the corresponding pixel of the corrected second image 152 including an image corresponding to the image of the pixel (x, y) forming the corrected first image 151 is (x+d, y).

It should be noted that the disparity calculation unit 220 generates the disparity map, in which the disparity information of the corrected first image 151 and the corrected second image 152 has been reflected, and the number of disparity maps generated is not one.

The disparity calculation unit 220 generates a plurality of disparity maps 225 corresponding to a plurality of different resolutions.

This process will be described in detail below.

In addition, the disparity calculation unit 220 calculates an object candidate region map 226 in which the existence probability of the object to be detected, for example, a person is represented in each pixel, using an evaluation value used for disparity calculation.

For the object candidate region map 226, similarly to the disparity map 225, the disparity calculation unit 220 generates a plurality of object candidate region maps 226 corresponding to a plurality of different resolutions.

An example of the configuration of the disparity calculation unit 220 and an example of the process of calculating the disparity map 225 and the object candidate region map 226 will be described in detail below.

The disparity map 225 and the object candidate region map 226 generated by the disparity calculation unit 220 are input to the classification unit 230.

The classification unit 230 receives the disparity map 225 and the object candidate region map 226 generated by the disparity calculation unit 220 and receives the first image feature amount 211 and the second image feature amount 212 from the feature amount extraction unit 210.

The classification unit 230 performs a process of detecting the object to be detected, on the basis of the input information. For example, in a case in which the detection target is a person, the classification unit 230 determines whether a person is present in each image region of the corrected first image 151 or the corrected second image and performs a process of classifying the image regions into a region in which the existence possibility of a person is high and a region in which the existence possibility of a person is low.

The classification unit 230 selects a region determined to have a high possibility of including the object to be detected, for example, a person by the object candidate region map 226, using the disparity map 225 or the object candidate region map 226 generated by the disparity calculation unit 220 and determines whether the object to be detected, for example, a person is present in the selected region.

The determination process is performed using the feature amount information 211 and 212 in the same region of the corrected first image 151 which is a visible image and the corrected second image 152 which is a far-infrared image.

The classification unit 230 passes the feature amounts through a machine-learned classifier to generate the determination result of whether the object to be detected, for example, a person is present in each image region.

That is, the classification unit 230 generates the object detection result 170 illustrated in FIG. 5 and outputs object detection result 170.

It should be noted that the object detection process using machine learning in the classification unit 230 can be performed using, for example, aggregated channel features (ACF) which are a detection algorithm disclosed in the above-mentioned Non-Patent Literature 1 [Multispectral Pedestrian Detection: Benchmark Dataset and Baseline (CVPR2015_MutispectalPedestrian.pdf)].

3. For Configuration and Process of Disparity Calculation Unit

Next, the configuration and process of the disparity calculation unit 220 will be described in detail with reference to FIG. 6.

Figure 6:
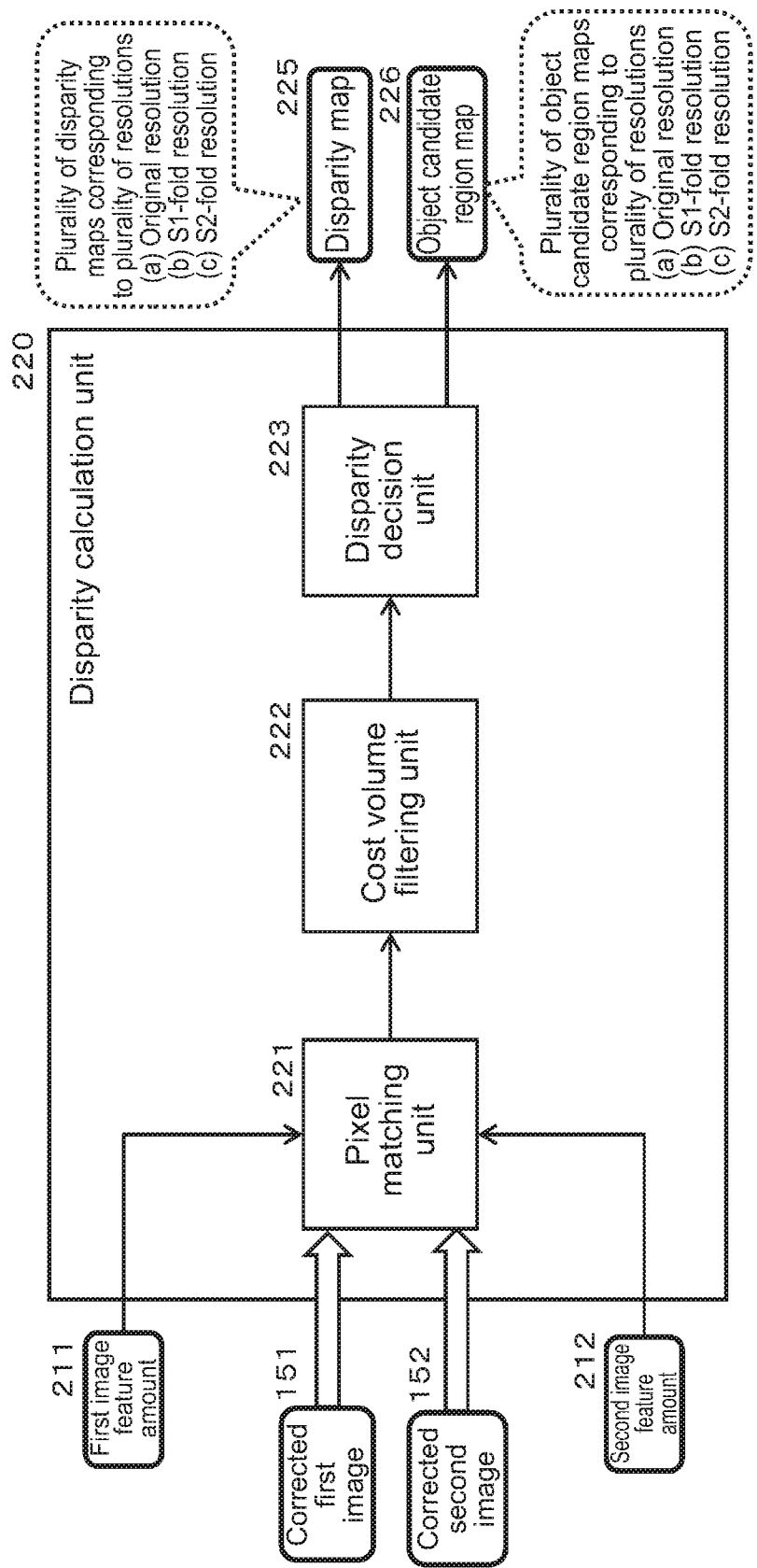
FIG. 6 is a diagram illustrating the configuration and process of a disparity calculation unit.

As illustrated in FIG. 6, the disparity calculation unit 220 includes a pixel matching unit 221, a cost volume filtering unit 222, and a disparity decision unit 223.

Hereinafter, processes performed by these units will be sequentially described.

[3-1. For Process Performed by Pixel Matching Unit]

First, the process performed by the pixel matching unit 221 of the disparity calculation unit 220 will be described.

Figure 7:
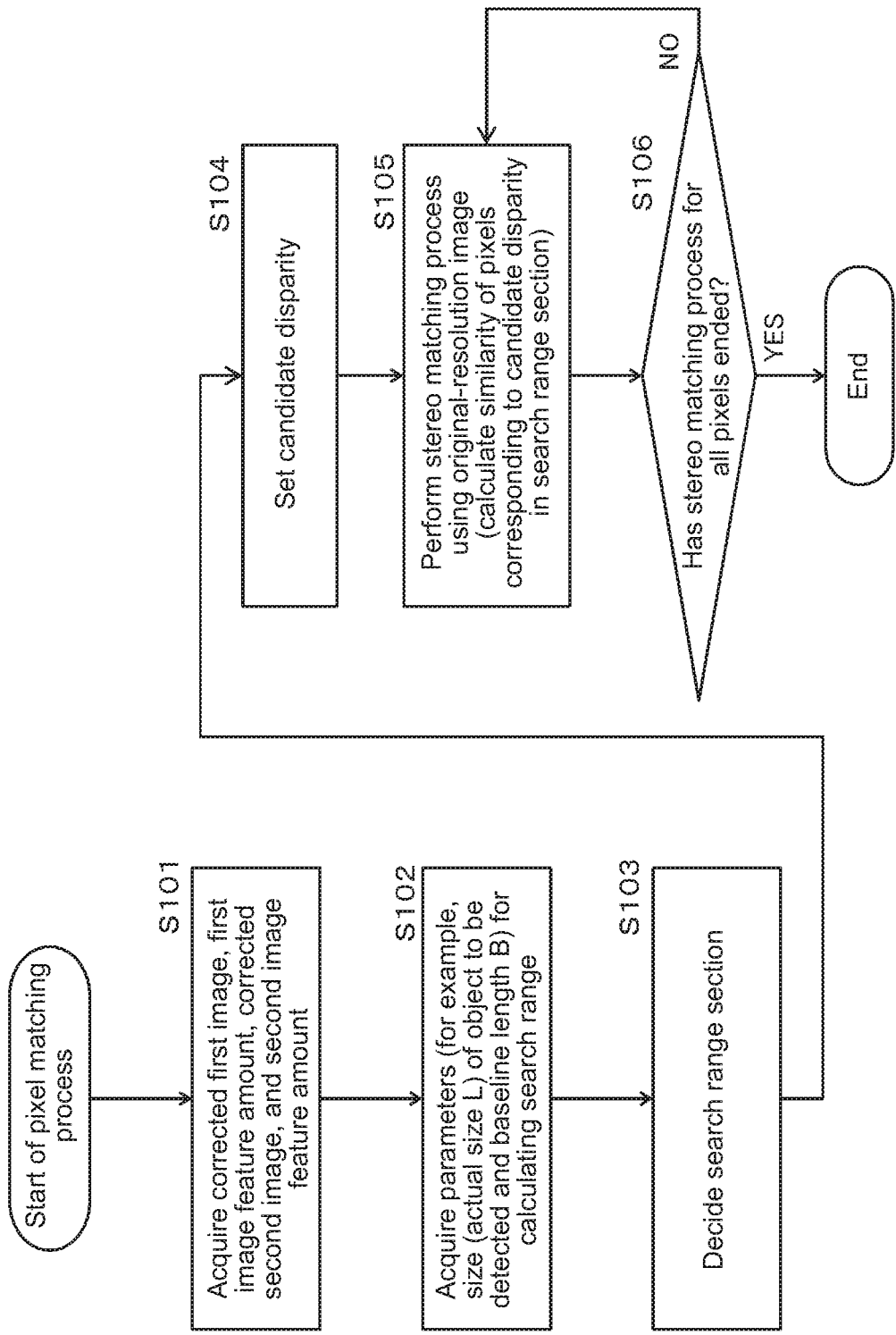
FIG. 7 is a flowchart illustrating a process performed by a pixel matching unit of the disparity calculation unit.

FIG. 7 is a flowchart illustrating the process performed by the pixel matching unit 221.

Processes in each step of the flowchart will be sequentially described.

(Step S101)

First, in Step S101, the pixel matching unit 221 receives the following:

(a) The corrected first image 151 which is a visible image after the calibration and the first image feature amount 211; and (b) The corrected second image 152 which is a far-infrared image after the calibration and the second image feature amount 212.

(Step S102)

Then, in Step S102, the pixel matching unit 221 acquires parameters applied to a search range section decision process to be performed in the next Step S103.

Specifically, the pixel matching unit 221 acquires parameters such as the size (actual size L) of the object to be detected and a baseline length B.

For example, in a case in which the detection target is a person, the height of a person is set to the size L of the object to be detected.

Specifically, for example, it is assumed that L is set to 170 cm.

The baseline length B is the distance between the optical axes of the cameras capturing two images. The distance between the optical axes of the visible imaging unit 107 and the far-infrared imaging unit 108 described with reference to FIG. 3 is acquired as the baseline length B.

It should be noted that, in the following Step S103, the pixel matching unit 221 decides a search range section which is a corresponding point search region, using at least one of the actual size of the object to be detected, the size of the object to be detected on the image, or the baseline length corresponding to the distance between two cameras capturing two images.

(Steps S103 and S104)

Then, the pixel matching unit 221 performs a search range section decision process in Step S103 and sets a candidate disparity in Step S104, The search range section is a second image search section that is set in a case in which a corresponding point of the first image is searched from the second image.

In addition, the candidate disparity is a disparity corresponding to a pixel position which is determined whether it is actually a corresponding point in the search section.

The process in Steps S103 and S104 will be described in detail below.

In a case in which the search range section is short, the processing time of the corresponding point search process (search process) is shortened and it is possible to perform an efficient process. However, in a case in which the search range section is set to be extremely short, the detection of a corresponding point is likely to fail.

Therefore, deciding the optimal region in which a corresponding point can be found as the search range is a factor in improving the efficiency and accuracy of the process.

The search range section decision process performed in Step S103 will be described with reference to FIGS. 8A and 8B.

Figure 8B:
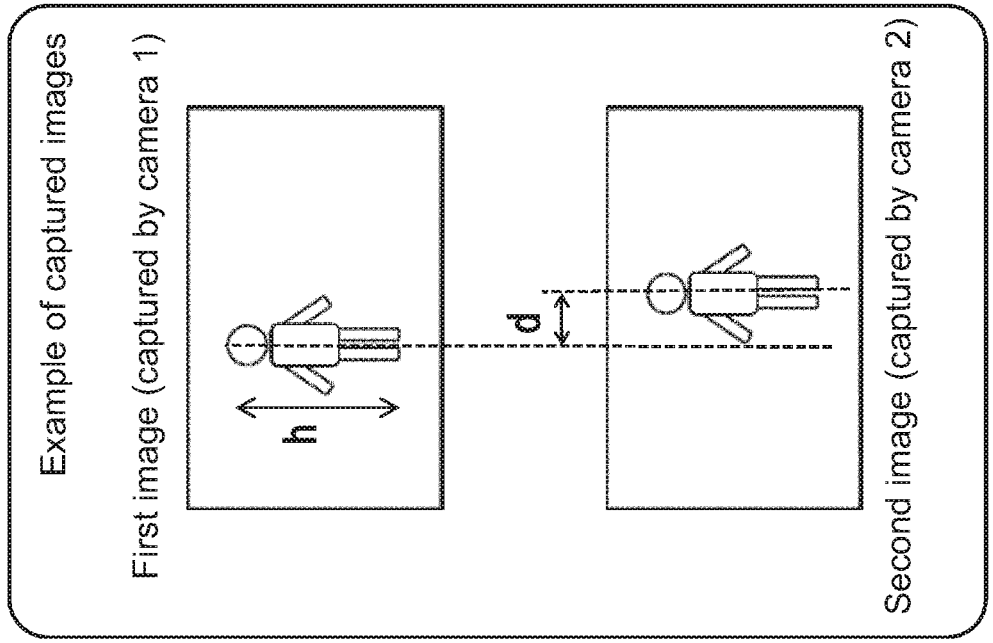
FIGS. 8A and 8B are diagrams illustrating an example of an imaging configuration, captured images, and parameters including a disparity.
Figure 8A:
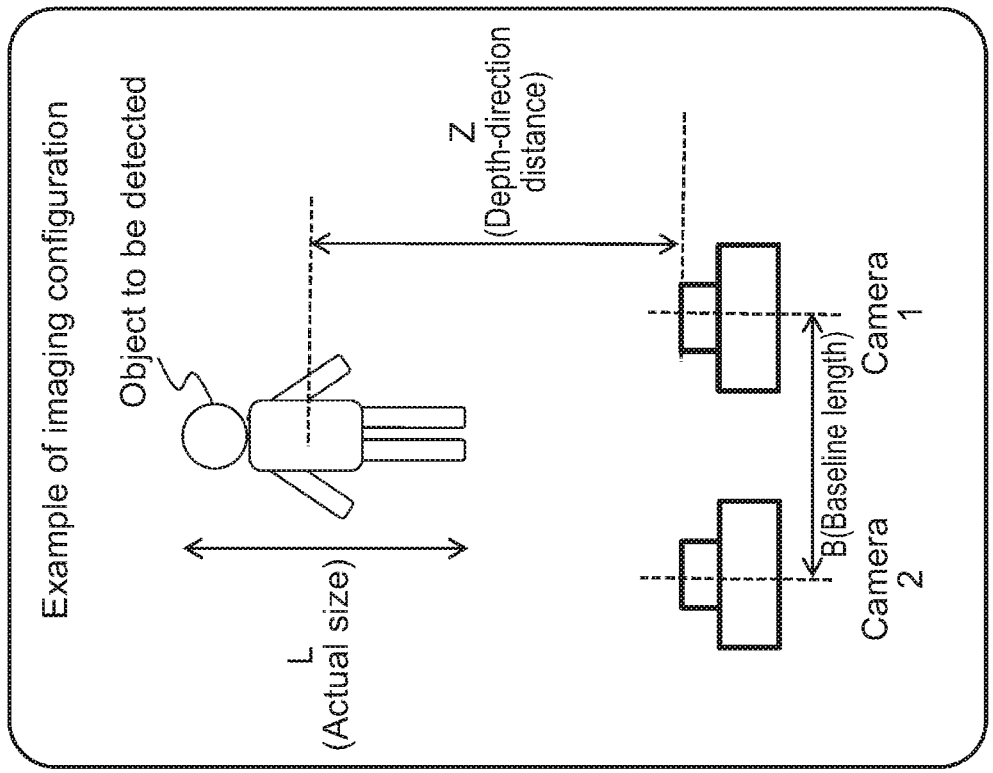

FIG. 8A is a diagram illustrating an example of an imaging configuration.

FIG. 8B is a diagram illustrating an example of captured images.

For example, it is assumed that the object to be detected is a "person" as illustrated in FIG. 8A.

Images including the object to be detected (person) are captured by two cameras, that is, camera 1 and camera 2 illustrated in FIG. 8A.

In this embodiment, the camera 1 and the camera 2 correspond to the visible imaging unit 107 and the far-infrared imaging unit 108 described with reference to FIG. 3, respectively.

FIG. 8B illustrates an example of the images captured by the camera 1 and the camera 2.

The first image is an image captured by the camera 1 and the second image is an image captured by the camera 2.

The camera 1 and the camera 2 capture images at positions that are a distance corresponding to the baseline length B [m] away from each other and the pixel positions (corresponding points) of the same object deviate from each other in the horizontal direction.

The amount of deviation is a disparity d [pixels].

It is assumed that the size (height), that is, the actual size of the object to be detected (person) is L (m).

In addition, it is assumed that the size (height) of the object to be detected (person) on the first image which is an image captured by the camera 1 is h [pixels].

As such, in a case in which the data of the actual size (height) L [m] of the object to be detected and the size (height) h [pixels] of the object on the image has been acquired, a depth-direction distance (a distance from the camera to the object to be detected) Z [m] of the object to be detected can be calculated on the basis of the focal length f [pixels] of the camera by the following (Expression 1):

$$Z=(f/h)L \quad \text{(Expression 1)}.$$

In addition, the depth-direction distance Z [m] and the disparity d [pixels] have the following relationship represented by the following (Expression 2) in accordance with the principle of triangulation in a case in which the distance (baseline length) between the camera 1 and the camera 2 is B [m]:

$$d=(fB/Z) \quad \text{(Expression 2)}.$$

Therefore, as illustrated in FIGS. 8A and 8B, in a case in which the actual size of the object to be detected is the height L [m] and the size of the object to be detected on the image is h [pixels], the disparity d [pixels] of the object between the first image and the second image is calculated by the following (Expression 3) in accordance with the above-mentioned (Expression 1) and (Expression 2):

$$d=(B/L)h \quad \text{(Expression 3)}.$$

In the above-mentioned (Expression 3), the baseline length B is a value obtained by camera calibration. For example, in a case in which the detection target is a pedestrian, the height L [m] of the object to be detected may be the average height of persons.

However, the size (height) h of a person on the image is uniquely determined since it is difficult to know in advance how large the object to be detected appears on the image.

In a case in which the same person with a certain height is far from the camera, the size (height) h of the person on the captured image is small. In a case in which the person is close to the camera, the size (height) h of the person on the captured image is large.

As such, the size of the object to be detected on the captured image varies in accordance with the distance between the object and the camera.

In a case in which the size of the object to be detected varies in accordance with the distance, the following process is performed as a general process for reliably detecting the object to be detected.

For example, images with a plurality of different resolutions are generated from the captured image and the object detection process is repeatedly and sequentially performed for the generated images with the plurality of resolutions.

This process is performed as a general object detection process.

For example, in the object detection algorithm described in the above-mentioned Non-Patent Literature [1], images with a plurality of resolutions, specifically, images enlarged or reduced at a plurality of different enlargement or reduction ratios are generated on the basis of the image (original-resolution image) captured by the camera and object detection is performed for the plurality of images while shifting a fixed-size detection window.

The object detection process using a plurality of different images will be described with reference to FIG. 9.

Figure 9:
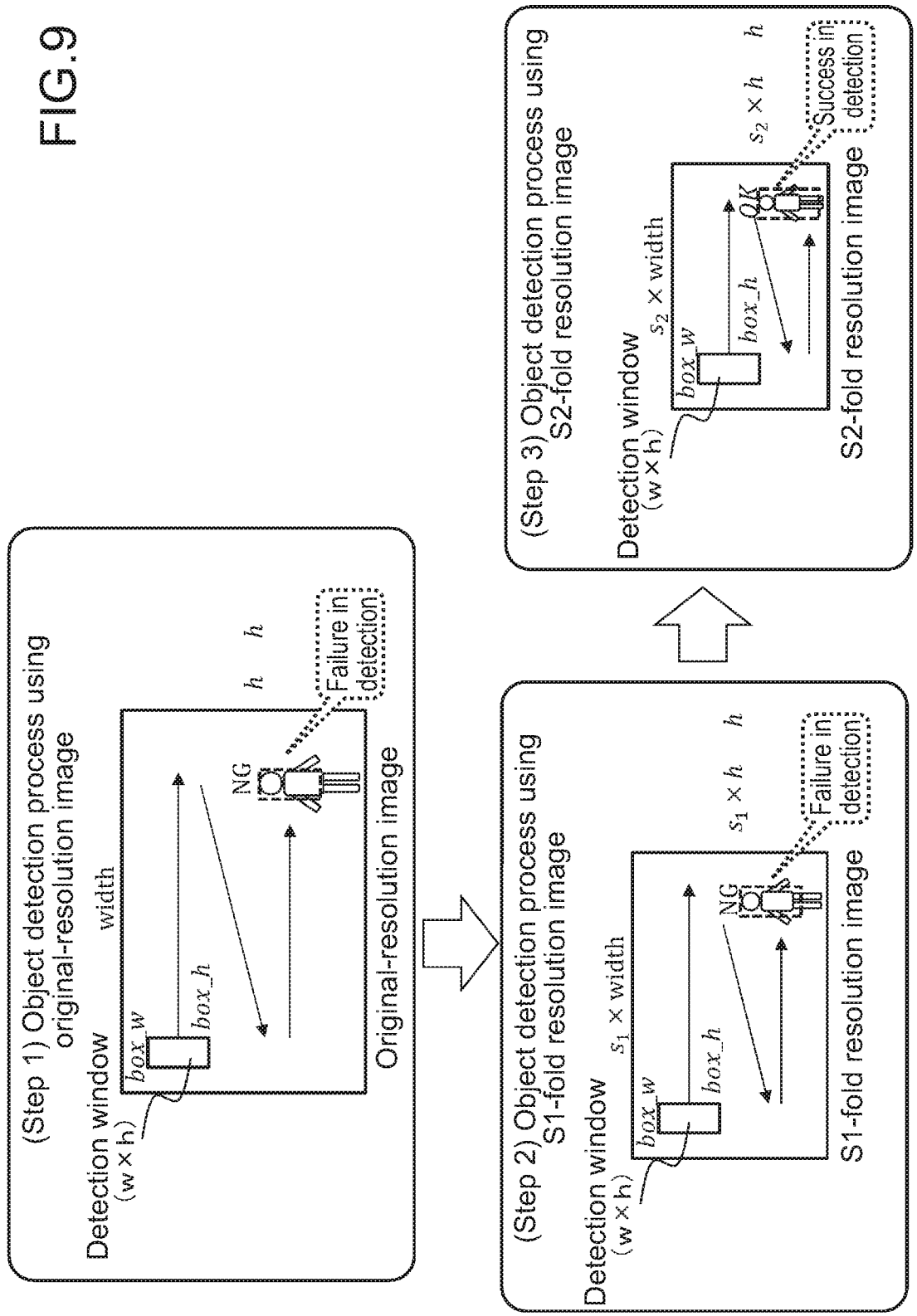

FIG. 9 illustrates an example of the object detection processes using the following three types of images:

(Step 1) An object detection process using an original-resolution image;

(Step 2) An object detection process using an S1-fold resolution image (S1-fold reduced image); and (Step 3) An object detection process using an S2-fold resolution image (S2-fold reduced image).

In this example, S1 and S2 are equal to or less than 1. For example, S1 is ½ and S2 is ¼. In this case, the S1-fold resolution image is a reduced image with a resolution that is half the resolution of the original-resolution image.

In addition, the S2-fold resolution image is a reduced image with a resolution that is a quarter of the resolution of the original-resolution image.

First, in Step 1, the object detection process using the original-resolution image is performed.

The original-resolution image in (Step 1) is an image captured by the camera, is not subjected to a resolution conversion process, such as enlargement or reduction, and is an image with the same resolution as the image captured by the camera, that is, an original-resolution image.

In the drawings, "width" and "height" indicate the horizontal size [pixels] and vertical size [pixels] of the original-resolution image, respectively.

In Step 1, the object detection process using a detection window with a predetermined size is performed for this image.

In the drawings, box_w and box_h indicate the horizontal size [pixels] and vertical size [pixels] of the detection window, respectively.

The object detection process using the detection window detects the feature amount of an image in the detection window, determines whether the detected feature amount is matched with or similar to the predetermined feature amount of the object to be detected, and determines whether the object to be detected is present in the window.

For example, in a case in which the object to be detected is a "person" and an image having characteristics (for example, an edge or brightness) corresponding to the head or face of the person located in the upper part of the detection window, the body or hands of the person located at the center of the detection window, and the feet of the person located in the lower part of the detection window has been detected, it is determined that the person is present in the window.

As illustrated in (Step 1) of FIG. 9, for example, the detection window is sequentially moved one pixel by one pixel from the upper left end of the original-resolution image in the right direction and the downward direction to determine whether the feature amount corresponding to the object to be detected is present in each pixel region.

In the example of (Step 1) illustrated in FIG. 9, an image region of a "person" that is the object to be detected is present on the lower right side. Since the image size of the person is larger than the size (w×h) of the detection window, it is difficult to determine that the image of the person is in the detection window and the detection fails.

Then, in (Step 2), the original-resolution image which is an image captured by the camera is reduced to generate the S1-fold resolution image and the same object detection process is performed for the S1-fold resolution image.

That is, the detection window having the same size (w×h) is applied and is moved from the upper left end of the S1-fold resolution image to the lower right end to determine whether the feature amount corresponding to the object to be detected is present in each pixel region.

In the example of (Step 2) illustrated in FIG. 9, similarly, an image region of a "person" that is the object to be detected is present on the lower right side. In Step 2, since the image size of the person is larger than the size (w×h) of the detection window, it is difficult to determine that the image of the person is in the detection window and the detection fails.

Then, in (Step 3), the image is further reduced to generate the S2-fold resolution image and the same object detection process is performed for the S2-fold resolution image.

That is, the detection window having the same size (w×h) is applied and is moved from the upper left end of the S2-fold resolution image to the lower right end to determine whether the feature amount corresponding to the object to be detected is present in each pixel region.

In the example of (Step 3) illustrated in FIG. 9, the size of the image of a "person" is equal to the size (w×h) of the detection window and it can be determined that the image of the person is present in the detection window. As a result, the detection succeeds.

As such, in a case in which the size h of the object to be detected on the image is not known in advance, it is necessary to perform the process described with reference to FIG. 9.

That is, it is necessary to repeat the object detection process which generates images with a plurality of sizes (a plurality of resolutions) and sequentially slides the detection window with respect to each image to determine similarity.

Only in a case in which the size of the object to be detected is equal to the size of the detection window, the object to be detected is detected.

In a case in which the size of the object to be detected is equal to the size of the detection window and the object to be detected is detected, it is possible to calculate the disparity d [pixels] for the object to be detected in accordance with (Expression 3) by substituting box_h into h of the above-mentioned (Expression 3), assuming that the size (h) of the object to be detected on the image is equal to the size (box_h) of the detection window.

However, the disparity d [pixels] calculated in accordance with the above-mentioned (Expression 3) is the disparity d in a case in which the original-resolution images are used as the images captured from two different viewpoints on the premise of the above-mentioned (Expression 1) and (Expression 2).

That is, as illustrated in FIG. 9 (Step 1), the original-resolution image is applied and the detection window with a size of (w×h) is applied. In a case in which the size of the object to be detected is equal to the size of the detection window, the disparity d [pixels] calculated in accordance with the above-mentioned (Expression 3) is the number of pixels corresponding to the positional deviation between the original-resolution images which are the images captured from two different viewpoints.

In a case in which the above-mentioned (Expression 2) or (Expression 1) is applied using the disparity d calculated by (Expression 3), it is possible to calculate a distance Z to the object to be detected.

In contrast, as illustrated in (Step 2) or (Step 3) of FIG. 9, the S1-fold resolution image or the S2-fold resolution image is applied and the detection window with the same size (w×h) is applied. In a case in which the size of the object to be detected is equal to the size of the detection window, the disparity d [pixels] calculated in accordance with (Expression 3) by substituting box_h into h of the above-mentioned (Expression 3) assuming that the size (h) of the object to be detected on the image is equal to the size (box_h) of the detection window does not correspond to the number of pixels corresponding to the positional deviation between the original-resolution images.

Therefore, even in a case in which the above-mentioned (Expression 2) or (Expression 1) is applied using the disparity d calculated by (Expression 3), it is difficult to calculate the distance Z to the object to be detected.

It is necessary to convert the size of the detection window into a size at the original resolution in order to calculate the distance Z to the object to be detected, using the disparity d calculated by the above-mentioned (Expression 3) and the above-mentioned (Expression 2) or (Expression 1).

Specifically, h=box_h/S1 may be established in the case of the S1-fold resolution image and h=box_h/S2 may be established in the case of the S2-fold resolution image.

The disparity calculation unit 220 of the object detection unit 200 in the image processing apparatus 100 according to the present disclosure illustrated in FIG. 6 generates a plurality of disparity maps 225, that is, disparity maps corresponding to a plurality of resolution images and outputs the generated disparity maps 225. Specifically, for example, the disparity calculation unit 220 generates the following maps corresponding to three types of resolution images and outputs the maps:

(a) A disparity map corresponding to the original-resolution image;

(b) A disparity map corresponding to the S1-fold resolution image; and (c) A disparity map corresponding to the S2-fold resolution image.

The disparity calculation unit 220 converts the size of the detection window into a size at the original resolution as follows:

h=box_h in a case in which the resolution of the output disparity map is the original resolution;

h=box_h/S1 in a case in which the resolution of the output disparity map is the S1-fold resolution image; and h=box_h/S2 in a case in which the resolution of the output disparity map is the S2-fold resolution image.

Then, the disparity calculation unit 220 calculates the disparity d in accordance with the above-mentioned (Expression 3), generates the disparity maps 225 corresponding to each resolution, and outputs the disparity maps 225.

As such, the output of the disparity calculation unit 225 includes the disparity maps 225 corresponding to a plurality of different resolutions.

It should be noted that, in the configuration of the present disclosure, a search range and a block size most suitable for the resolution of the disparity map which is finally output are set.

In addition, in the configuration of the present disclosure, images with a plurality of resolutions are prepared. Then, stereo matching is not performed for each of the images, but is performed, using only the original-resolution image, to reduce intermediate data (cost volume). Finally, the intermediate data (cost volume) is used to obtain disparity maps corresponding to a plurality of resolutions.

It should be noted that, in a case in which an accurate value is obtained in advance as the actual height L of the object to be detected, the disparity d can be accurately calculated in accordance with the above-mentioned (Equation 3), on the basis of the size (height) h of the object to be detected on the images with each resolution. Therefore, searching in the pixel matching is not required.

However, for example, in a case in which the object to be detected is a person, there are individual differences in height (for example, adults and children) and the height also changes in accordance with a change in posture.

As such, in a case in which it is difficult to accurately acquire the actual height L of the object to be detected, it is necessary to search for a peripheral region on the basis of the disparity d calculated by the above-mentioned (Expression 3).

For example, in a case in which the resolution of the output disparity map is the original resolution and the disparity d calculated by (Expression 3) is do, a search range section 0 is set as a search range section $0=d_0-2, d_0-1, d_0, d_0+1, d_0+2$, considering a margin of ±2 pixels.

This setting is the setting of a search range (search range section) in the process of searching for a corresponding point between the original-resolution images which are the images captured from different viewpoints, specifically, the corrected first image 151 and the corrected second image input to the disparity calculation unit 220 illustrated in FIG. 6 in this embodiment.

In a case in which one of the two images is a reference image and the other image is a corresponding point search image, a region in the range of −2 pixels to +2 pixels from a position that deviates from the same pixel position in the corresponding point search image as that in the reference image by the disparity do in the horizontal direction is set as the search range section.

That is, a margin of ±2 pixels is set.

It should be noted that the pixel margin to be set and the selection of candidate disparities, that is, the setting of a pixel spacing at which the corresponding point search is performed may be changed in accordance with the image resolution of the disparity map that is finally output.

For example, in a case in which the resolution of the disparity map to be finally output is the S1-fold resolution and the disparity value calculated by (Expression 3) is $d_1$, the pixel spacing of the candidate disparity may be set to every two pixels such that a search range section 1 is set as a search range section $1=d_1-4, d_1-2, d_1, d_1+2, d_1+4$.

As such, the disparity d is calculated from the actual height L of the object to be detected, the size h of the object on the image, and the baseline length B between the cameras and only a search pixel center position decided by the disparity d and the periphery of the search pixel center position are set as the search region (search range section).

This process can reduce the amount of calculation and matching errors caused by extra search.

The search range section decision process of Step S103 and the candidate disparity setting process of Step S104 in the flow illustrated in FIG. 7 have been described above.

(Step S105)

Then, in Step S105 of the flow illustrated in FIG. 7, the pixel matching unit 221 performs a stereo matching process using the original-resolution image.

Specifically, the pixel matching unit 221 calculates the similarity between the pixels corresponding to the candidate disparity in the search range section decided in Steps S103 and S104 and searches for the corresponding points of the visible image and the far-infrared image which are images captured from different viewpoints, that is, the corrected first image 151 and the corrected second image 152 illustrated in FIG. 5.

The similarity calculation process is a process of determining the similarity between the pixels corresponding to the candidate disparity in the search region (search range section) decided in Steps S103 and S104, that is, pixels which are actually corresponding point determination targets in two images in the search section.

That is, the similarity calculation process is a pixel matching determination process.

Various methods can be used to evaluate similarity in pixel matching. Here, an example of an evaluation method in the detection of a pedestrian using a visible image and a far-infrared image will be described.

For example, an example in which the brightness and color information and gradient information (strength and a direction) of the visible image and the temperature information and gradient information (strength and a direction) of the far-infrared image are used as the feature amounts in the detection of a pedestrian using the visible image and the far-infrared image will be described.

It is assumed that the feature amount extraction unit 210 illustrated in FIG. 5 acquires the following feature amounts from the visible image and the far-infrared image, that is, the corrected first image 151 and the corrected second image 152 illustrated in FIG. 5:

Gradient strength $Mag_1$ and gradient direction $Ori_1$ corresponding to each pixel (x, y) of the visible image (corrected first image 151); and Gradient strength Mage and gradient direction $Ori_2$ corresponding to each pixel (x, y) of the far-infrared image (corrected second image 152).

Similarity represented by the following (Expression 4) is defined on the basis of the feature amounts of each image:

$$\text{Similarity}(x,y,d) = \min(\text{Mag}_1(x,y), \text{Mag}_2(x+d,Y))\varphi(x,y,d) \quad \text{(Expression 4)}$$

Elements in (Expression 4) are defined as follows:

(x, y): coordinates indicating a pixel position of one of the images to be subjected to similarity calculation, d: the number of pixels corresponding to the positional deviation between two images to be subjected to similarity calculation (=a candidate disparity), $$\Phi(x,y,d) = (\cos(2\theta(x,y,d))+1)/2 \quad \text{(Expression 5)}$$

and $$\theta(x,y,d) = Ori_1(x,y) - Ori_2(x+d,y) \quad \text{(Expression 6)}$$

In the above-mentioned (Expression 4), φ is an evaluation value related to the cosine of a value obtained by multiplying the difference θ between the gradient directions of a pixel (x, y) of the visible image and a pixel (x+d, y) of the far-infrared image by 2 as defined by (Expression 5) and (Expression 6). The double-angle cosine is used in order to allow the reversal of the gradient directions of the visible image and the far-infrared image. The evaluation value φ related to the gradient direction is weighted with gradient strength "min ($Mag_1$(x, y), $Mag_2$(x+d, y))" to calculate the similarity.

The evaluation value is weighted with the smaller of the gradient strength values of the two images in order to increase the similarity only in a case in which an edge (large gradient) common to the two images is present. This configuration makes it possible to obtain reliable similarity in the pixels in which there is an edge common to the two images, such as the contour of a person, is present.

It should be noted that, as described above, the similarity evaluation method is not limited to this method and various methods can be used in accordance with input sensor information (image).

(Step S106)

Then, in Step S106, the pixel matching unit 221 determines whether the stereo matching process of Step S105 for all of the pixels has ended. In a case in which the stereo matching process for all of the pixels has not ended, the pixel matching unit 221 continuously performs the process of Step S105 for unprocessed pixels.

In a case in which the stereo matching process for all of the pixels has ended, the pixel matching unit 221 ends the process.

The process performed by the pixel matching unit 221 of the disparity calculation unit 220 illustrated in FIG. 6 has been described above.

Figure 10:
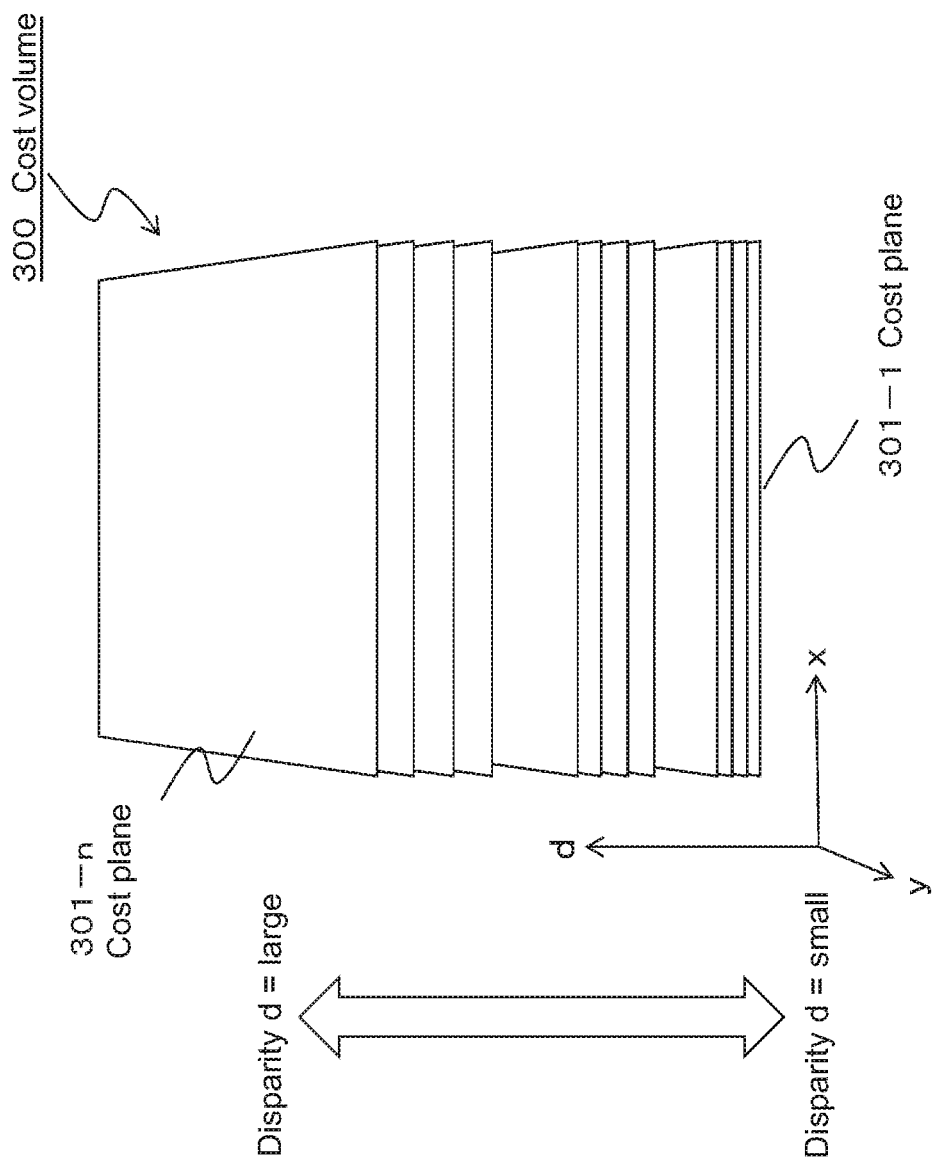

As a result of this process, a cost volume which is a stack of cost planes in which similarity for each pixel is set to each of the pixels forming the image is generated for all of the candidate disparities as illustrated in FIG. 10.

That is, a cost volume which is a stack of images (cost planes) in which the value of the similarity calculated by the above-mentioned (Expression 4), that is, Similarity(x, y, d)=min($Mag_1$(x, y), $Mag_2$(x+d, y))Φ(x, y, d) is set to each of the pixels forming the images is generated.

FIG. 10 illustrates an example of a cost volume 300.

As illustrated in FIG. 10, the cost volume 300 includes a plurality of cost planes 301-1 to 301-n.

Each of the cost planes 301-n corresponds to an image in which the value of the similarity corresponding to the maximum value to the minimum value of the disparity d, for example, each disparity d=0 to ∞ is set to each of the pixels forming the image.

Specifically, for example, the cost plane is a monochrome image in which a pixel value that becomes closer to black as the similarity becomes higher and becomes closer to white as the similarity becomes lower is set to each pixel.

Alternatively, the cost plane may be a monochrome image in which a pixel value that becomes closer to white as the similarity becomes higher and becomes closer to black as the similarity becomes black is set to each pixel.

Alternatively, the cost plane may be an image in which a color corresponding to the similarity is set or may be a map in which a numerical value corresponding to the similarity is associated with a pixel position.

In the cost plane 301-1 in the lowest layer of the cost volume 300 illustrated in FIG. 10, for example, a pixel value that corresponds to the similarity corresponding to the disparity d=0 is set. For example, the cost plane 301-1 is an image in which a pixel value closer to black is set to a pixel closer to the disparity d=0.

Specifically, for example, the disparity d=0 is a disparity corresponding to an object that is far from the camera and the cost plane 301-1 is an image in which a pixel region of the object that is far from the camera is set to black or gray close to black.

In the cost plane 301-n in the uppermost layer, for example, a pixel value that corresponds to the similarity corresponding to the disparity d=∞ is set. For example, the cost plane 301-n is an image in which a pixel value closer to black is set to a pixel closer to the disparity d=co.

Specifically, for example, the disparity d=∞ is a disparity corresponding to an object that is close to the camera and the cost plane 301-n is an image in which a pixel region of the object that is close to the camera is set to black or gray close to black.

For example, an example in which a "person" as the object to be detected is present in each of some cost planes in an upper layer region, some cost planes in a middle layer region, and some cost planes in a lower layer region of the cost volume 300 illustrated in FIG. 10 will be described with reference to FIG. 11.

Figure 11:
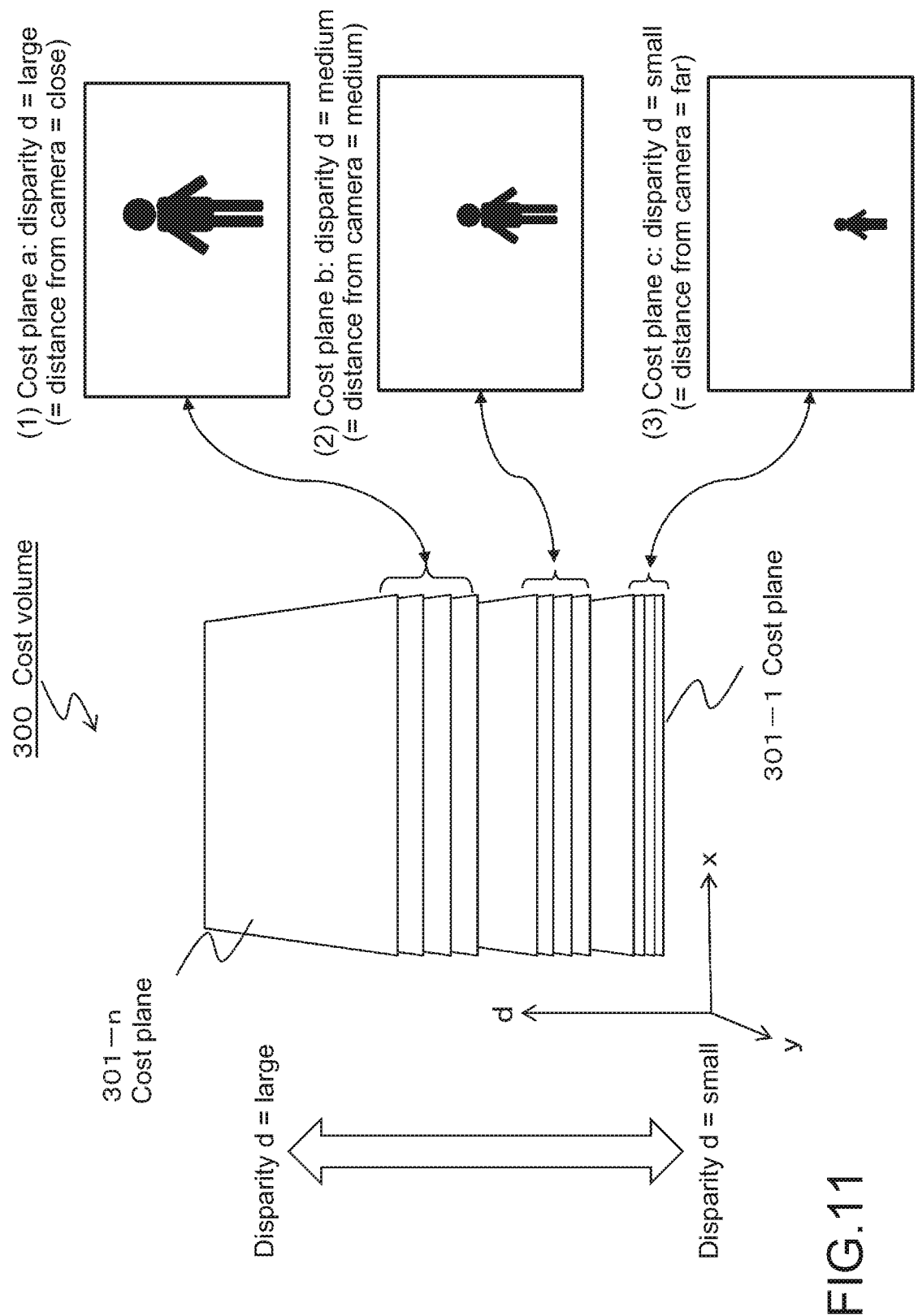

FIG. 11 illustrates an example of the following three cost planes:

(1) A cost plane a: the disparity d=large (=the distance from the camera=close);

(2) A cost plane b: the disparity d=medium (=the distance from the camera=medium); and (3) A cost plane c: the disparity d=small (=the distance from the camera=far)

(1) The cost plane a: the disparity d=large (=the distance from the camera=close) indicates an example of a cost plane in the upper part of the cost volume 300, that is, one cost plane with the disparity d=large (=the distance from the camera=close). In a case in which a "person" that is the object to be detected is present in a disparity region corresponding to this cost plane, a region of the "person" that is the object to be detected is set black in the disparity map of this plane. The size of the person is large since the distance from the camera is far.

(2) The cost plane b: the disparity d=medium (=the distance from the camera=medium) indicates an example of a cost plane in the middle of the cost volume 300, that is, one cost plane with the disparity d=medium (=the distance from the camera=medium). In a case in which a "person" that is the object to be detected is present in a disparity region corresponding to this cost plane, a region of the "person"

that is the object to be detected is set black in the disparity map of this plane. The size of the person is medium since the distance from the camera is medium.

(3) The cost plane c: the disparity d=small (=the distance from the camera=far) indicates an example of a cost plane in the lower part of the cost volume 300, that is, one cost plane with the disparity d=small (=the distance from the camera=far). In a case in which a "person" that is the object to be detected is present in a disparity region corresponding to this cost plane, a region of the "person" that is the object to be detected is set black in the disparity map of this plane. The size of the person is small since the distance from the camera is far.

It should be noted that the cost planes 301-1 to 301-n forming the cost volume 300 are planes generated on the basis of the result of the stereo matching process performed by the pixel matching unit 221 using the original-resolution image and all of the cost planes 301-1 to 301-n have a resolution corresponding to the original-resolution image.

[3-2. For Process Performed by Cost Volume Filtering Unit]

Next, a process performed by the cost volume filtering unit 222 of the disparity calculation unit 220 illustrated in FIG. 6 will be described.

The cost volume filtering unit 222 performs a process of filtering the cost volume described with reference to FIGS. 10 and 11 to generate cost volumes corresponding to a plurality of different resolutions.

Figure 12:
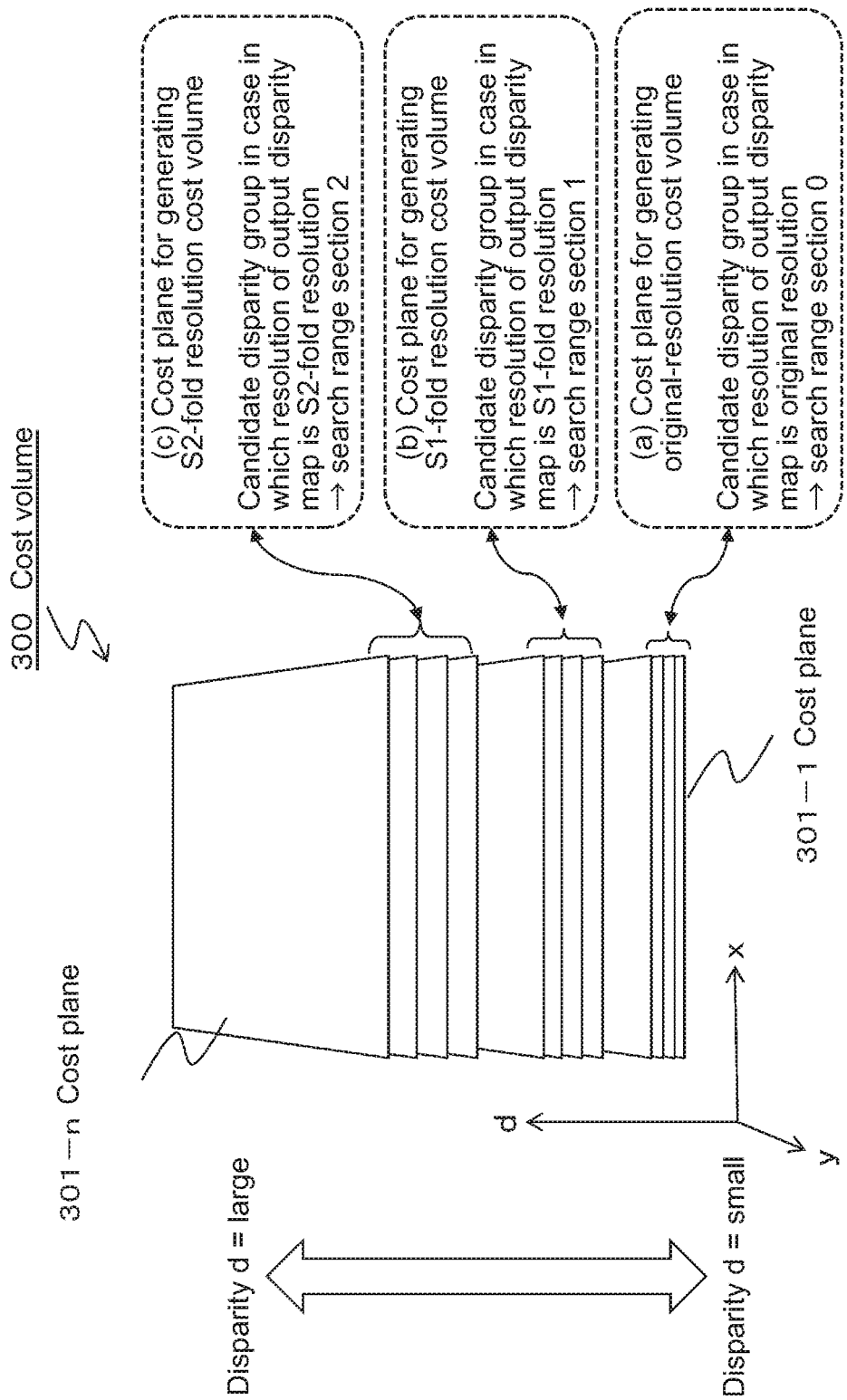

For example, as illustrated in FIG. 12, the cost volume filtering unit 222 generates three types of cost volumes using the following three types of cost planes for generating cost volumes:

(a) An original-resolution cost volume generation process using a cost plane for generating an original-resolution cost volume;

(b) An S1-fold resolution cost volume generation process using a cost plane for generating an S1-fold resolution cost volume; and (c) An S2-fold resolution cost volume generation process using a cost plane for generating an S2-fold resolution cost volume.

A plurality of resolution cost volumes generated by (a) to (c) corresponds to three types of cost volumes to which the following three types of cost planes described with reference to FIG. 11 belong:

(1) The cost plane a: the disparity d=large (=the distance from the camera=close);

(2) The cost plane b: the disparity d=medium (=the distance from the camera=medium); and (3) The cost plane c: the disparity d=small (=the distance from the camera=far).

It should be noted that, in this example, S1 and S2 are equal to or less than 1, S1 is, for example, ½, and S2 is, for example, ¼. In this case, the S1-fold resolution image is a reduced image with a resolution that is half the resolution of the original-resolution image.

In addition, the S2-fold resolution image is a reduced image with a resolution that is a quarter of the resolution of the original-resolution image.

Figure 13:
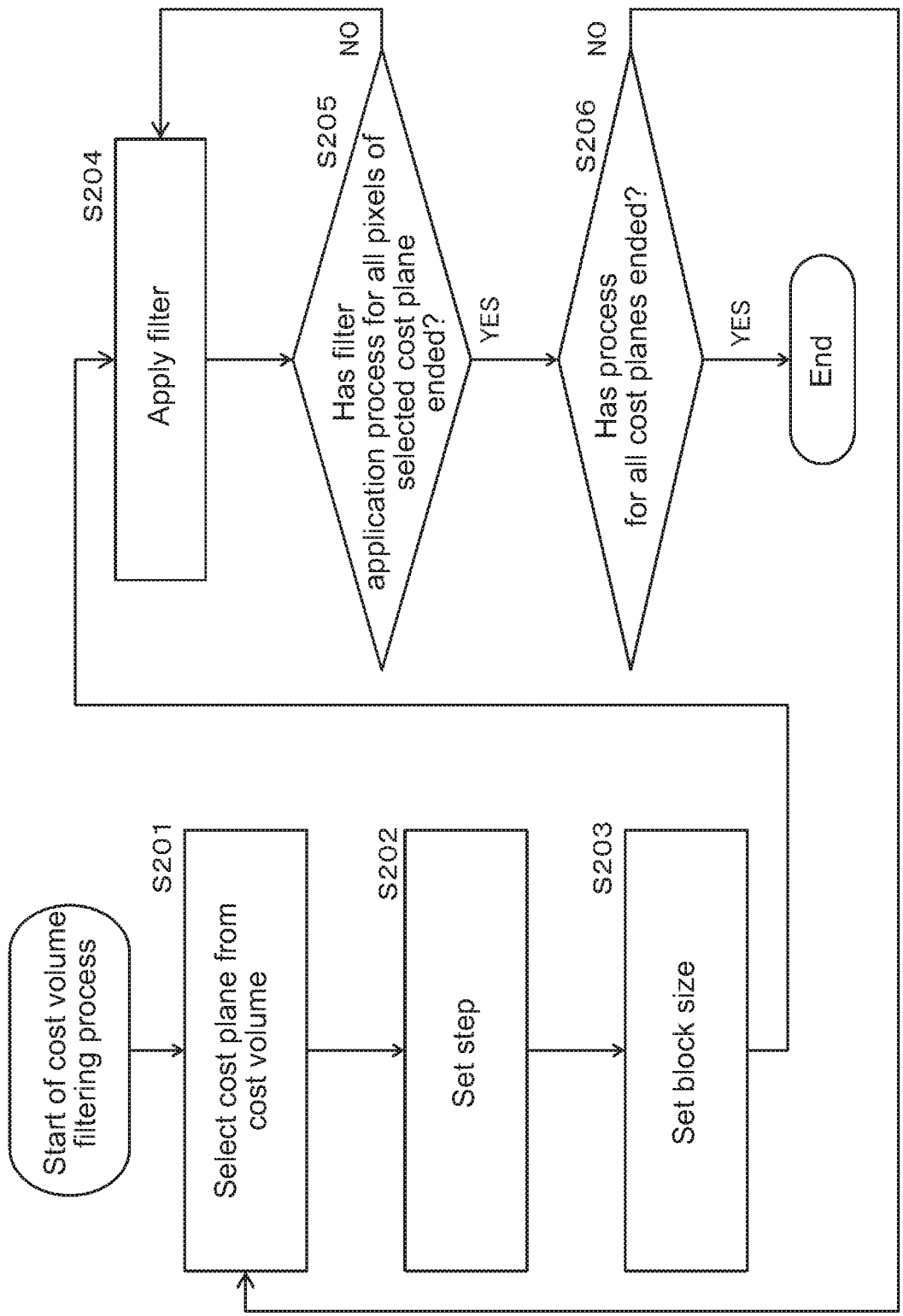

FIG. 13 is a flowchart illustrating the process of the cost volume filtering unit 222 that performs the cost volume filtering process.

Processes in each step of the flowchart will be sequentially described.

(Step S201)

First, in Step S201, the cost volume filtering unit 222 selects one cost plane to be processed from the cost volume described with reference to FIG. 10.

For example, there are n cost planes 1 to n, the cost volume filtering unit 222 sequentially selects one cost plane from the n cost planes.

(Step S202)

Then, in Step S202, the cost volume filtering unit 222 performs a step setting process. The step is the spacing between the pixels to be subjected to filtering, that is, a so-called thinning process.

The cost volume filtering unit 222 changes the spacing between the pixels to be filtered to generate a cost volume of low-resolution images from a cost volume of high-resolution images (original-resolution images).

The step setting in Step S202 is a process of setting the spacing between the pixels to be filtered.

For example, the reciprocal of the magnification of the image is set as the spacing between the pixels to be filtered.

That is, the setting of the step (filtering pixel spacing) varies in accordance with the resolution of the disparity map output from the disparity calculation unit 220 to the classification unit 230. For example, the step is set as follows.

In a case in which the output disparity map is the original resolution, the step (filtering pixel spacing) is set to one pixel.

In a case in which the output disparity map is the S1-fold resolution, the step (filtering pixel spacing) is set to (1/S1) pixels.

In a case in which the output disparity map is the S2-fold resolution, the step (filtering pixel spacing) is set to (1/S2) pixels.

Specifically, for example, in a case in which S1 is ½, the output disparity map is a ½-fold resolution image. In this case, the step (filtering pixel spacing) is set to (1/S1)=two pixels.

In a case in which S2 is ¼, the output disparity map is a ¼-fold resolution image. In this case, the step (filtering pixel spacing) is set to (1/S2)=four pixels.

For example, in a case in which the output disparity map is the original resolution, the step (filtering pixel spacing) is set to one pixel, no pixels are thinned out. The image is output without being reduced.

In addition, for example, in a case in which S1 is ½ and a low-resolution image corresponding to an image reduced to half is generated, the step (filtering pixel spacing) is set to (1/S1) pixels=two pixels and a process of setting two pixels to one pixel is performed.

Further, for example, in a case in which S2 is ¼ and a low-resolution image corresponding to an image reduced to a quarter is generated, the step (filtering pixel spacing) is set to (1/S2) pixels=four pixels and a process of setting four pixels to one pixel is performed.

(Step S203)

Then, in Step S203, the cost volume filtering unit 222 sets the block size (kernel size) of a filter.

The block size (kernel size) of the filter corresponds to the size of a filter applied to generate each resolution image and is the size of a block that defines a pixel region of surrounding pixels to be referred to in a case in which pixel values forming each resolution (original-resolution/S1-fold resolution/S2-fold resolution) image are calculated.

Figure 14:
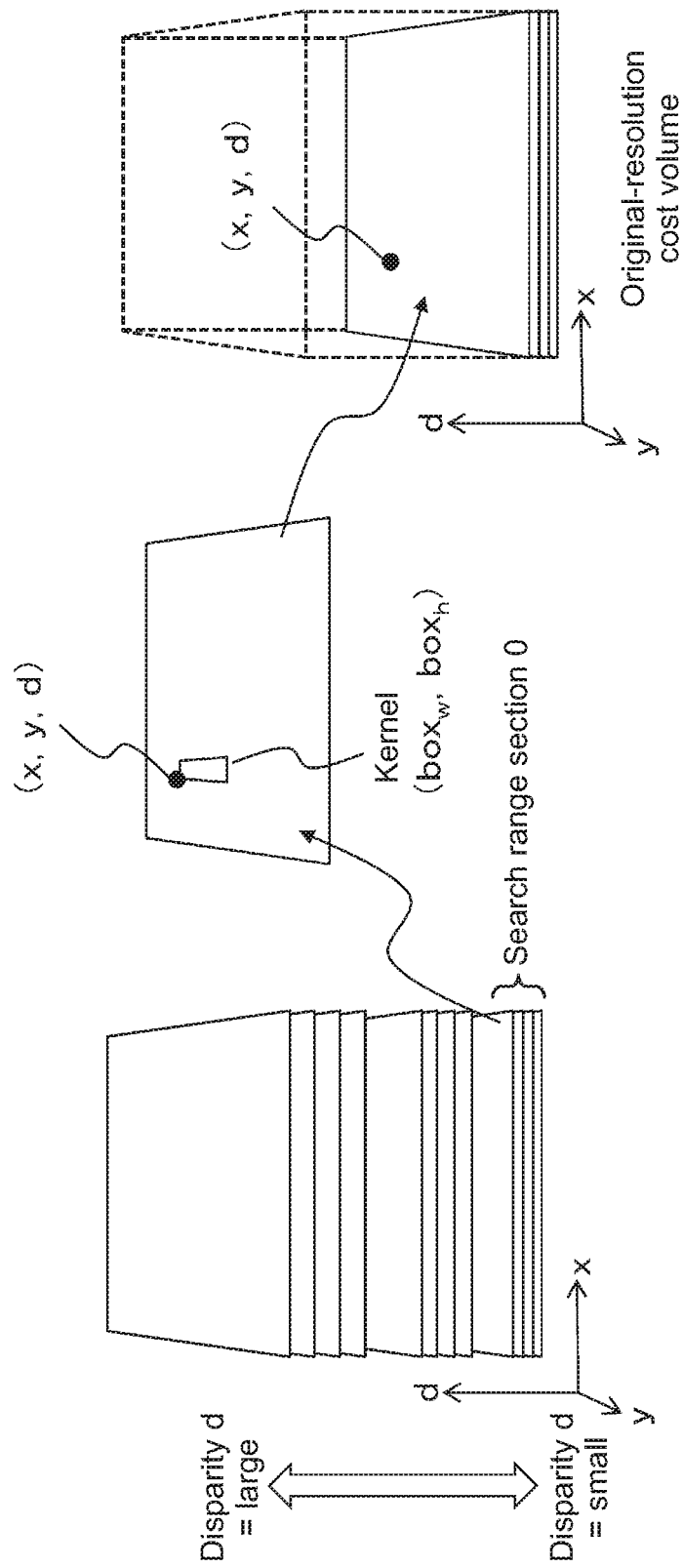
Figure 15:
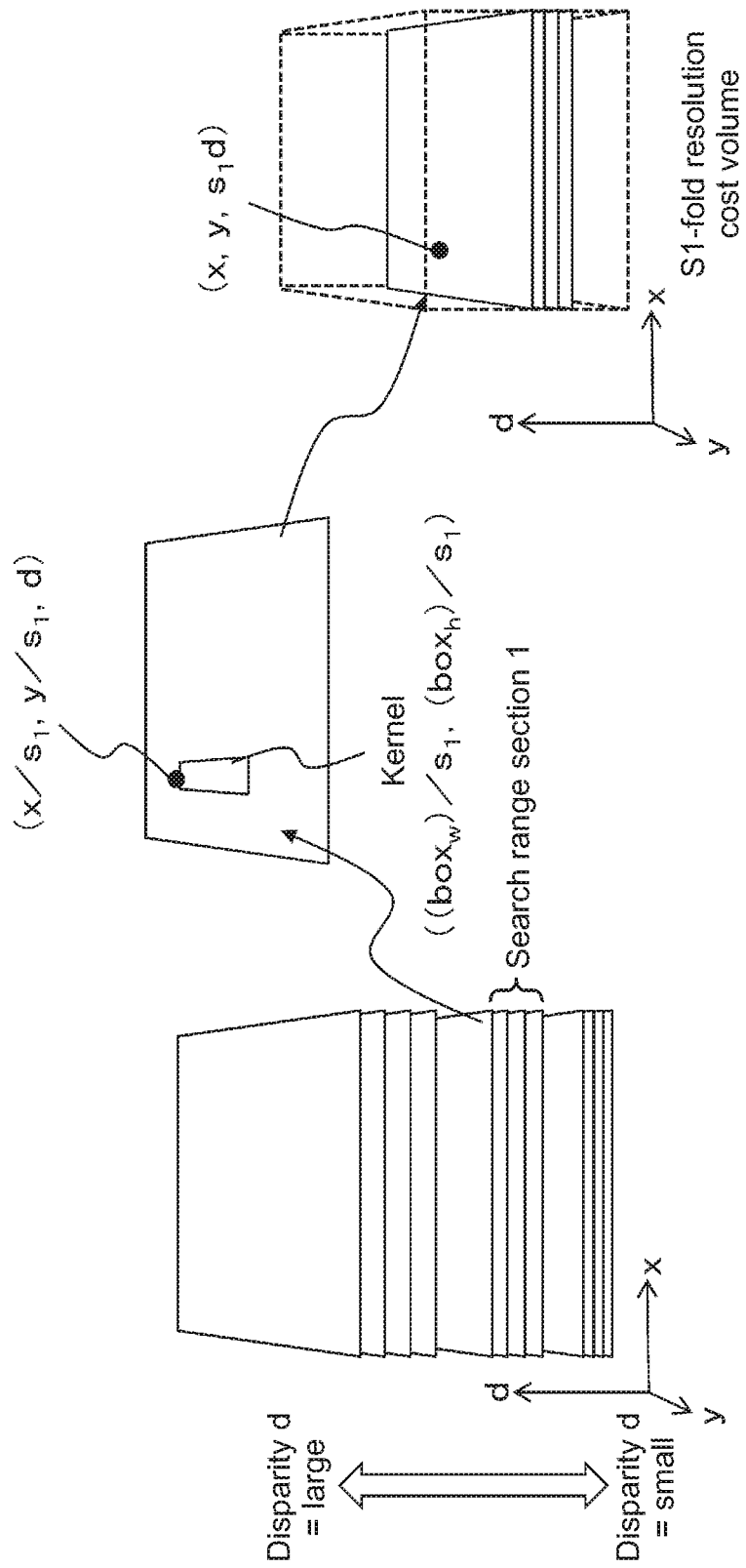
Figure 16:
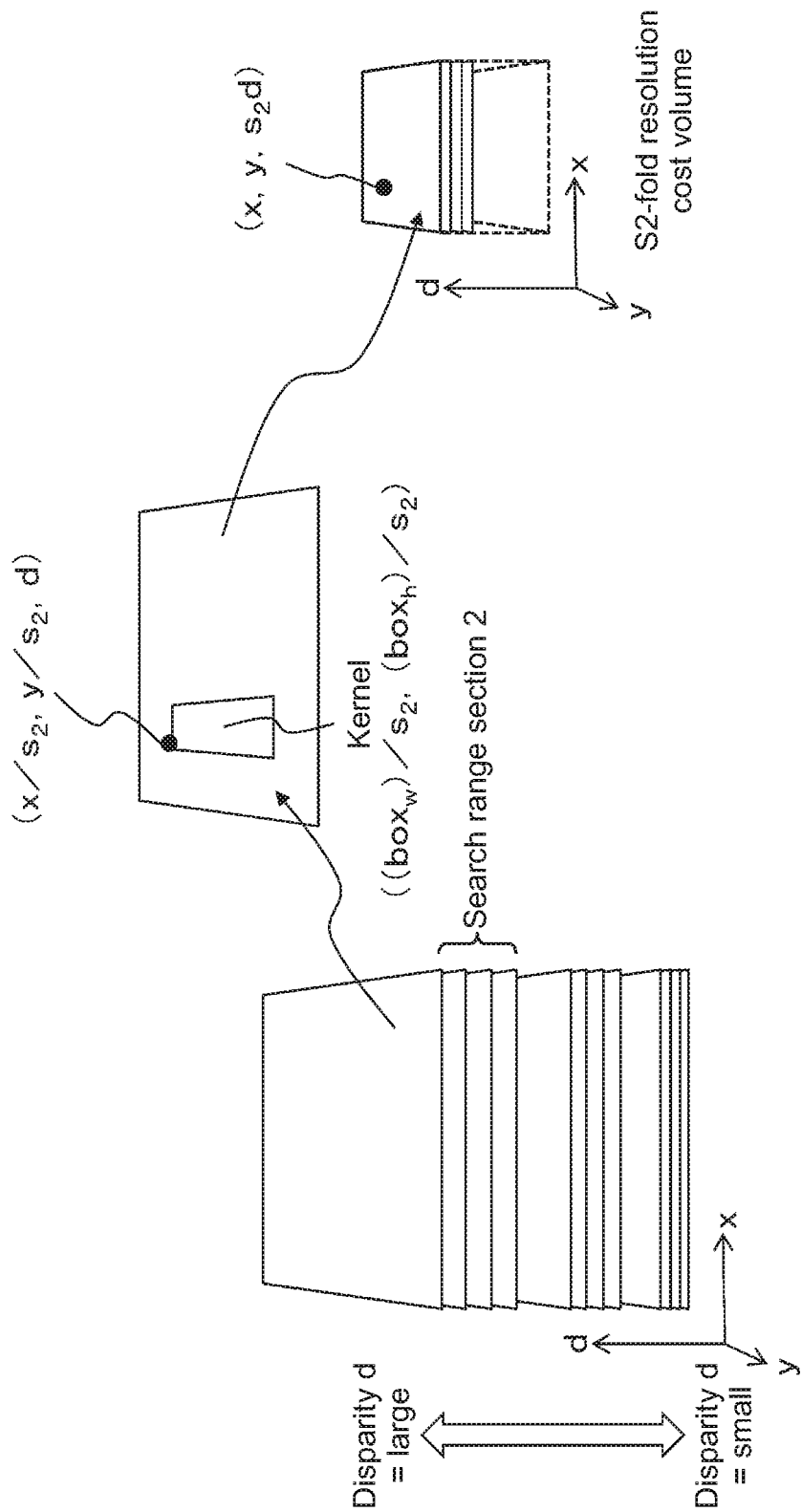

As illustrated in FIGS. 14 to 16, the block size (kernel size) of the filter is set in accordance with the resolution of the cost volume to be generated. Specifically, the block size of the filter is set as follows.

As illustrated in FIG. 14, in a case in which the output disparity map is the original resolution, the block size (kernel size) of the filter is set to (box_w, box_h).

In addition, as illustrated in FIG. 15, in a case in which the output disparity map is the S1-fold resolution, the block size (kernel size) of the filter is set to (box_w/S1, box_h/S1).

Further, as illustrated in FIG. 16, in a case in which the output disparity map is the S2-fold resolution, the block size (kernel size) of the filter is set to (box_w/S2, box_h/S2).

It should be noted that, for example, the size of the detection window set in order to detect the object to be detected (for example, a person) which has been described with reference to FIG. 9 can be used as the block size (kernel size) of the filter.

The detection window corresponds to the size of the detection window that is used by the classification unit 230 in the subsequent stage to determine whether an object in each detection window is the object to be detected, for example, a person.

(Step S204)

Then, in Step S204, the cost volume filtering unit 222 performs the filtering process on the basis of the step (filtering pixel spacing) set in Step S202 and the block size (kernel size) set in Step S203.

Specifically, as illustrated in FIGS. 14 to 16, the cost volume filtering unit 222 performs the filtering process for the cost plane selected in accordance with the resolution of the disparity map to be output.

FIG. 14 illustrates an example of a process in a case in which the resolution of the output disparity map is the original resolution.

FIG. 14 is a diagram illustrating a filtering process for cost planes belonging to a group corresponding to the disparity d=small (=the distance from the camera=far) among the cost planes forming the cost volume 300. For example, the filtering process is performed as a process of applying an averaging filter to the cost planes of each candidate disparity in the search range section 0.

A value after filtering at a pixel (x, y) (Similarity(x, y, d)) is represented by the following (Expression 7).

[Math. 1]

$$\text{Similarity}(x, y, d) = \sum_{0 \leq u < box\_w} \sum_{0 \leq v < box\_h} \text{Similarity}(x+u, y+v, d) \quad (\text{式 7})$$

It should be noted that the size of the filtered cost plane formed by Similarity(x, y, d) calculated by the above-mentioned (Expression 7) is an original resolution (width, height).

FIG. 15 is a diagram illustrating a filtering process for cost planes belonging to a group corresponding to the disparity d=medium (=the distance from the camera=medium). For example, the filtering process is performed as a process of applying an averaging filter to the cost planes of each candidate disparity in the search range section 1.

A value after filtering at the pixel (x, y) (Similarity(x, y, d)) is represented by the following (Expression 8).

[Math. 2]

$$\text{Similarity}(x, y, S_1 d) = \sum_{0 \leq u < \frac{box\_w}{S_1}} \sum_{0 \leq v < \frac{box\_h}{S_1}} \text{Similarity}\left(\frac{x}{S_1}+u, \frac{y}{S_1}+v, d\right) \quad (\text{式 8})$$

It should be noted that the size of the filtered cost plane formed by Similarity(x, y, d) calculated by the above-mentioned (Expression 8) is an S1-fold resolution (S1× width, S1×height).

FIG. 16 is a diagram illustrating a filtering process for cost planes belonging to a group corresponding to the disparity d=large (=the distance from the camera=close). For example, the filtering process is performed as a process of applying an averaging filter to the cost planes of each candidate disparity in the search range section 2.

A value after filtering at the pixel (x, y) (Similarity(x, y, d)) is represented by the following (Expression 9).

[Math. 3]

$$\text{Similarity}(x, y, S_2 d) = \sum_{0 \leq u < \frac{box\_w}{S_2}} \sum_{0 \leq v < \frac{box\_h}{S_2}} \text{Similarity}\left(\frac{x}{S_2}+u, \frac{y}{S_2}+v, d\right) \quad (\text{式 9})$$

It should be noted that the size of the filtered cost plane formed by Similarity(x, y, d) calculated by the above-mentioned (Expression 9) is an S2-fold resolution (S2× width, S2×height).

As such, the cost volume filtering unit 222 performs the filtering process for the cost plane selected in accordance with the resolution of the disparity map to be output.

Figure 17:
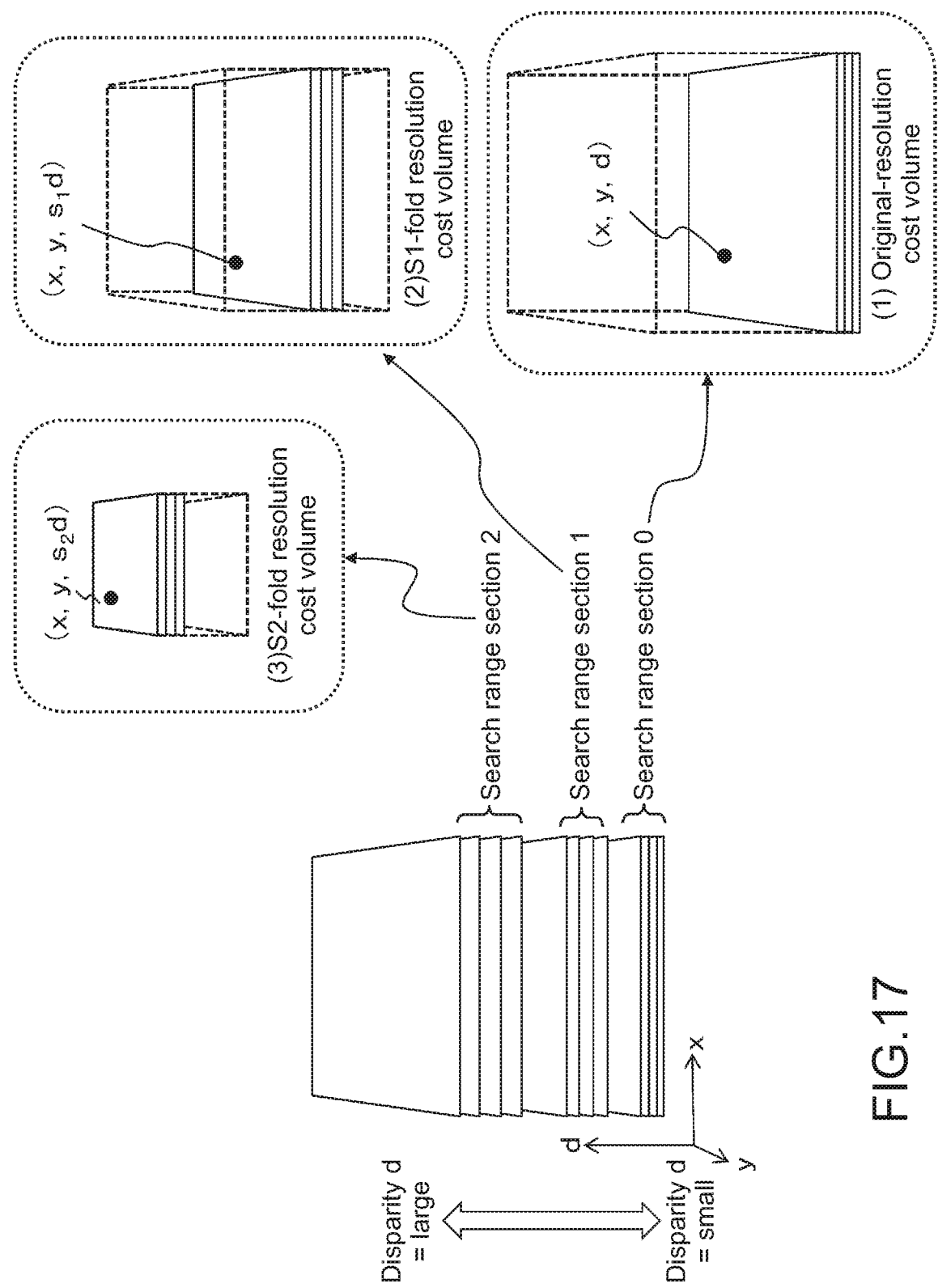
Figure 18:
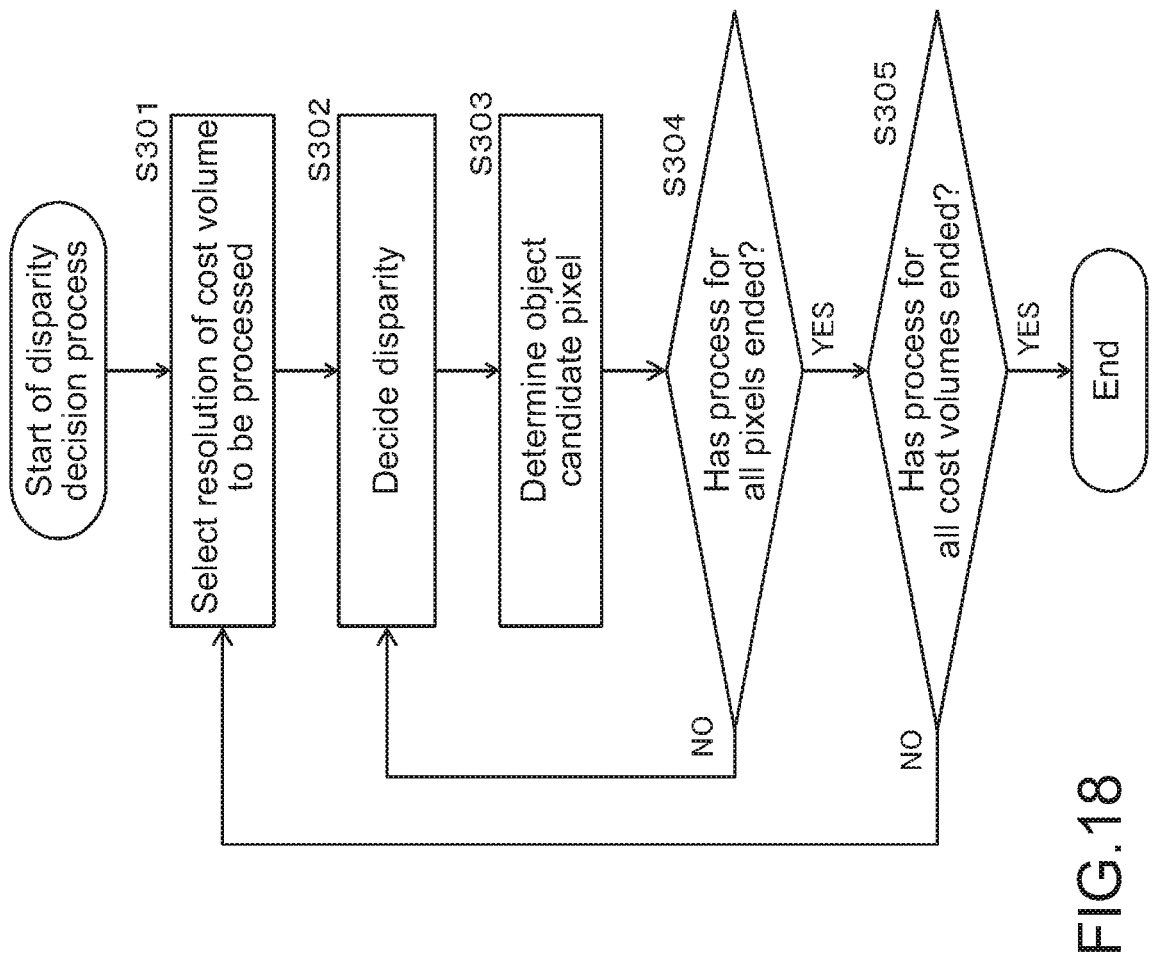

As a result, for example, as illustrated in FIG. 17, cost volumes corresponding to three types of different resolutions are generated:

(1) An original-resolution cost volume;
(2) An S1-fold resolution cost volume; and
(3) An S2-fold resolution cost volume.

As such, the cost volume filtering unit 222 changes the spacing between the pixels to be filtered in accordance with the magnitude of the disparity d to generate a low-resolution cost volume from a high-resolution cost volume. In addition, the kernel size of the filter can be set in accordance with the resolution of the cost volume to be generated to obtain a matching result at a block size suitable for the size of the object to be detected.

It should be noted that a better result is obtained as the block size (kernel size) becomes closer to the size of the object to be detected. In a case in which the block size is too small, robustness to noise is reduced and the matching result is unstable. On the other hand, in a case in which the block size is too large, the disparities of the foreground and the background are mixed at the object boundary, which results in a reduction in the accuracy of matching. In addition, the cost volume filtering unit 222 changes the spacing between the pixels to be filtered to generate a low-resolution cost volume from a high-resolution cost volume.

[3-3. For Process Performed by Disparity Decision Unit]

Next, the process performed by the disparity decision unit 223 of the disparity calculation unit 220 illustrated in FIG. 6 will be described.

The disparity decision unit 223 decides a disparity value with the highest similarity for each pixel of the cost volumes corresponding to each resolution input from the cost volume filtering unit 222 and generates a disparity map.

The process performed by the disparity decision unit 223 of the disparity calculation unit 220 will be described with reference to FIG. 17.

(Step S301)

First, in Step S301, the disparity decision unit 223 selects the resolution of the cost volume to be processed.

The disparity decision unit 223 receives the cost volumes corresponding to each resolution from the cost volume filtering unit 222. Specifically, for example, the disparity decision unit 223 receives the following three types of cost volumes described with reference to FIGS. 14 to 17:

(1) The original-resolution cost volume;
(2) The S1-fold resolution cost volume; and
(3) The S2-fold resolution cost volume.

In Step S301, the disparity decision unit 223 selects, for example, the resolution of the cost volume to be processed from the cost volumes corresponding to each resolution described in (1) to (3).

(Step S302)

Then, in Step S302, the disparity decision unit 223 performs a disparity decision process on the basis of the cost volume corresponding to the resolution selected as the processing target to generate disparity maps corresponding to each resolution.

The cost volume corresponding to one resolution described with reference to FIGS. 14 to 17 includes a plurality of cost planes.

The pixel value corresponding to the similarity described with reference to (Expression 7) to (Expression 9) is set to each of the cost planes.

For example, the pixel value is set such that it is closer to black (low brightness) as the similarity becomes higher and is closer to white (high brightness) as the similarity becomes lower.

The disparity decision unit 223 compares the pixel values (similarities) at the same pixel position (corresponding pixel position) in the plurality of cost planes included in the cost volume corresponding to the selected resolution, selects a cost plane with the highest similarity, and decides the disparity d of the selected cost plane as a disparity D of the pixel position.

This process can be represented by the following (Expression 10).

[Math. 4]

$$D(x, y) = \underset{d}{\mathrm{argmax}}\, \mathrm{Similarity}(x, y, d) \qquad (式 10)$$

The disparity D(x, y) of a pixel position (x, y) is calculated in accordance with the above-mentioned (Expression 10).

The process represented by the above-mentioned (Expression 10) is performed for each pixel of the cost volume corresponding to the selected resolution.

A disparity map corresponding to one resolution is generated by this process.

The disparity map is a map in which the value of the difference D(x, y) calculated by the above-mentioned (Expression 10) is set to each pixel position (x, y).

(Step S303)

Then, in Step S303, the disparity decision unit 223 performs an object candidate pixel determination process to generate an object region candidate map.

The disparity decision unit 223 generates an object candidate region map indicating a region (pixel region) in which the existence probability of the object, for example, the object to be detected, such as a person, is high on the basis of the disparity D(x, y) corresponding to each pixel calculated in the disparity decision process of Step S302 or the similarity at the disparity D(x, y).

As described above, in the similarity evaluation expression defined by the above-mentioned (Expression 4), the similarity is high only in a case in which there is an edge (large gradient) common to two images captured from different viewpoints.

For example, in the contour of a person, there is an edge common to the two images. Therefore, a similarity with high reliability is obtained.

Specifically, for example, the value of the similarity is large in the candidate disparity of the correct answer in which a person is present and is small in at the other disparity values.

In contrast, for example, in the background with few textures, the similarity is the same in any candidate disparity. In addition, the similarity is low since there is no edge (high gradient strength).

In Step S303, the disparity decision unit 223 determines a region (pixel region) in which the existence probability of the object to be detected, such as a person, is high, in consideration of this situation.

Specifically, in the disparity decision process using the above-mentioned (Expression 10), in a case in which the value of the similarity at the time of disparity decision is equal to or greater than a predetermined threshold value, the pixel is selected as an object candidate pixel and is marked. For example, an object candidate region map in which the object candidate pixel is 1 and the other pixels are 0 is generated.

(Step S304)

Then, in Step S304, the disparity decision unit 223 determines whether the generation of the object candidate region map based on the disparity decision process in Step S302$k$ and the object candidate pixel determination in Step S303 has been completed.

In a case in which there is an unprocessed image, the disparity decision unit 223 repeatedly performs the process in Steps S302 and S303 for an unprocessed pixel.

In a case in which the process for all of the pixels has ended and it is determined that the process for the cost volume corresponding to one resolution has ended, the disparity decision unit 223 proceeds to Step S305.

(Step S305)

Then, in Step S305, the disparity decision unit 223 determines whether the process for the cost volumes corresponding to all resolutions has ended.

In a case in which there is a cost volume corresponding to an unprocessed resolution, the disparity decision unit 223 repeatedly performs the process from Steps S301 to S304 for the cost volume corresponding to an unprocessed resolution.

In a case in which it is determined that the process for the cost volumes corresponding to all resolutions has ended, the disparity decision unit 223 ends the process.

The disparity decision unit 223 generates disparity maps and object candidate region maps which correspond to the cost volumes corresponding to a plurality of different resolutions input from the cost volume filtering unit 222, using the process according to this flow, and outputs these maps to the classification unit 230 illustrated in FIG. 5.

Figure 19:
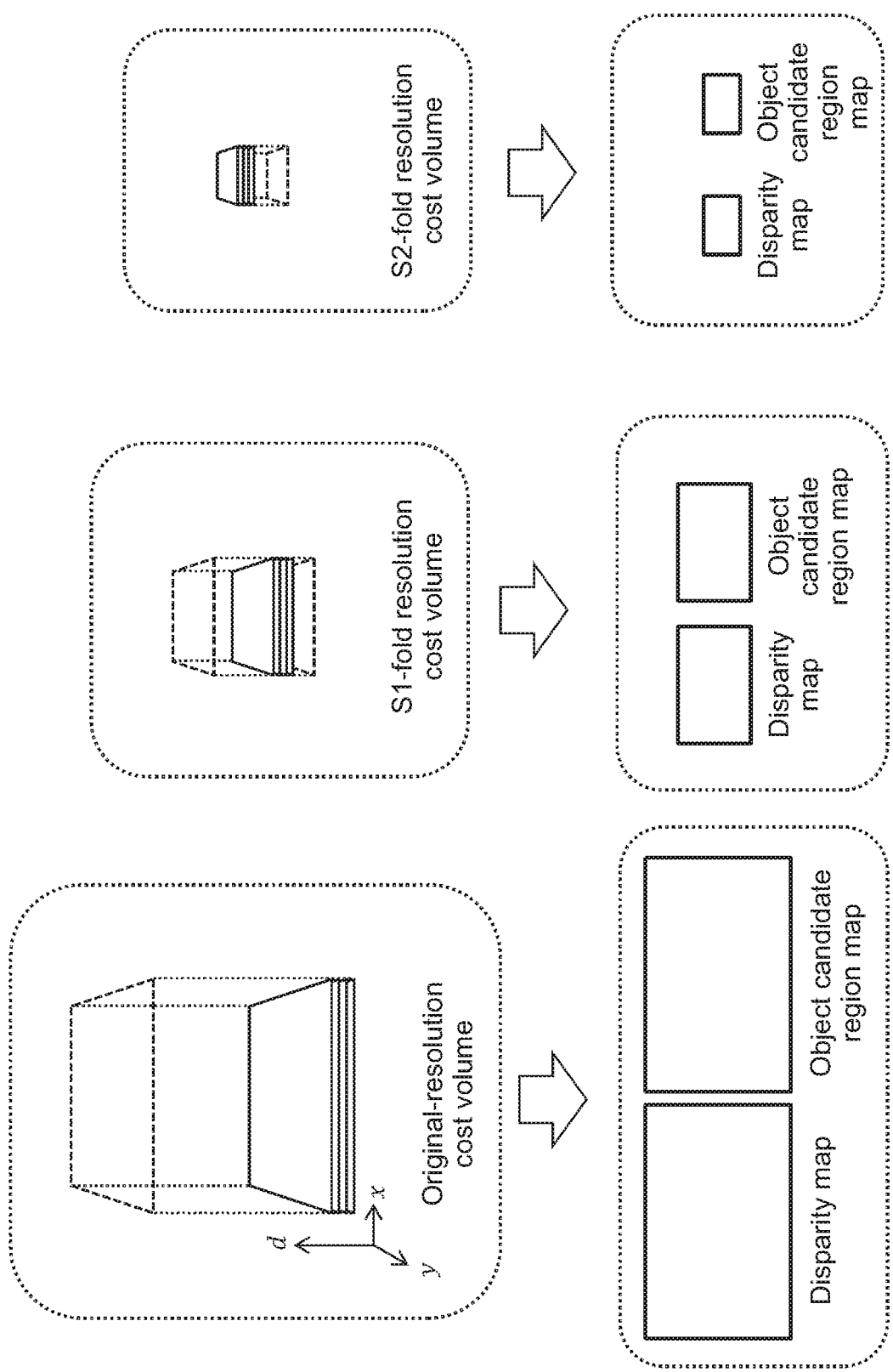

That is, as illustrated in FIG. 19, the disparity decision unit 223 generates the following data and outputs the generated data to the classification unit 230:

(1) A disparity map and an object candidate region map corresponding to the original-resolution cost volume;
(2) A disparity map and an object candidate region map corresponding to the S1-fold resolution cost volume; and (3) A disparity map and an object candidate region map corresponding to the S2-fold resolution cost volume.

The classification unit 230 detects the object to be detected, for example, a person, using the disparity maps and the object candidate region maps corresponding to the plurality of resolutions.

In this process, the classification unit 230 performs a classification process for only the object candidate pixels, using the object candidate region maps. The execution of the process for the limited region makes it possible to reduce the amount of calculation.

As described with reference to FIG. 9, the general object detector disclosed in, for example, Non-Patent Literature [1] performs a detection process while sliding the detection window on the images with a plurality of resolutions. As a result, the amount of calculation is very large. In contrast, in the process according to the present disclosure, the classification process is performed for only the object candidate pixels, using the generated object candidate region map, in the subsequent stage. Therefore, it is possible to reduce the amount of calculation.

4. Other Embodiments

The embodiment of the image processing according to the present disclosure has been described above. However, the configuration and process of the above-described embodiment can be changed in several points.

Next, modification examples thereof will be described.

[4-1. For Modification Example of Similarity Calculation Process of Pixel Matching Unit]

In the above-described Embodiment 1, the pixel matching unit 221 of the disparity calculation unit 220 performs the similarity calculation process based on two images captured from a plurality of different in different viewpoints.

Specifically, as illustrated in FIG. 6, the pixel matching unit 221 of the disparity calculation unit 220 receives the corrected first image 151 which is a calibration image based on the visible image and the corrected second image 152 which is a calibration image based on the far-infrared image and performs the similarity calculation process based on two images captured from two different viewpoints.

In the above-described embodiment, the similarity calculation process calculates the similarity represented by the above-mentioned (Expression 4). That is, the following (Expression 4) is used:

Similarity$(x,y,d)$=min(Mag$_1(x,y)$, Mag$_2(x+d,y))\Phi(x,y,d)$ (Expression 4).

The similarity calculation process represented by (Expression 4) is an example and other evaluation expressions may be used in accordance with an input image.

In addition, the following feature amounts are used in the evaluation expression of (Expression 4) and are extracted by the feature amount extraction unit 210 illustrated in FIG. 5:

the gradient strength Mag$_1$ and the gradient direction Ori$_1$ corresponding to each pixel (x, y) of the visible image (corrected first image 151); and the gradient strength Mag$_2$ and the gradient direction Ori$_2$ corresponding to each pixel (x, y) of the far-infrared image (corrected second image 152).

However, the feature amounts applied to the similarity calculation process are not limited thereto and other feature amounts may be used. In addition, feature amounts other than the feature amounts calculated in advance may be used.

[4-2. For Modification Example of Cost Volume Filtering Process of Cost Volume Filtering Unit]

In the above-described Embodiment 1, the cost volume filtering unit 222 of the disparity calculation unit 220 performs a process, using the averaging filter as the filter applied in the filtering process for the cost plane.

The filtering process performed for the cost plane by the cost volume filtering unit 222 is not to the process using the averaging filter and may be any process using other filters. For example, a Gaussian filter or a bilateral filter may be used.

In addition, in a case in which the process using the averaging filter is performed, for example, a speed-up method using an integral image may be used.

[4-3. For Modification Example of Disparity Decision Process of Disparity Decision Unit]

In the above-described Embodiment 1, the disparity decision unit 223 of the disparity calculation unit 220 calculates the disparity decision process which compares the pixel values (similarities) at the same pixel position (corresponding pixel position) in a plurality of cost planes included in the cost volume corresponding to a specific selected resolution, selects a cost plane with the highest similarity, and decides the disparity d of the cost plane as the disparity d of the pixel position, using the above-mentioned (Expression 10).

The disparity D(x, y) of the pixel position (x, y) is calculated in accordance with the above-mentioned (Expression 10). A disparity map corresponding to one resolution is generated by this process.

The disparity map is a map in which the value of the difference D(x, y) calculated by the above-mentioned (Expression 10) is set to each pixel position (x, y).

Methods other than the above-mentioned (Expression 10) may be used to calculate the disparity. For example, the following method may be applied: after a global optimization process, such as a belief propagation method or a graph-cut method, is performed for the cost volume, the calculation expression of (Expression 10) is applied to the disparity.

[4-4. For Modification Example of Object Candidate Region Map Generation Process of Disparity Decision Unit]

In the above-described Embodiment 1, the disparity decision unit 223 of the disparity calculation unit 220 performs a process that generates the object candidate region map indicating the region (pixel region) in which the existence probability of the object, for example, the object to be detected, such as a person, is high on the basis of the disparity D(x, y) corresponding to each pixel calculated in the disparity decision process or the similarity at the disparity D(x, y).

That is, the process is a process of determining the region (pixel region) in which the existence probability of the object to be detected, such as a person, is high.

Specifically, in the disparity decision process using the above-mentioned (Expression 10), in a case in which the value of the similarity at the time of disparity decision is equal to or greater than a predetermined threshold value, the pixel is selected as the object candidate pixel and is marked. For example, the object candidate region map in which the object candidate pixel is 1 and the other pixels are 0 is generated.

Other methods may be used to generate the object candidate region map. For example, image processing, such as morphology processing (closing processing or opening processing), may be performed for the object candidate region map, in which a pixel having a similarity value equal to or greater than a predetermined value is 1 and the other pixels are 0, in order to remove noise and the result of the image processing may be output as the object candidate region map to the classification unit 230.

As described above, the image processing apparatus according to the present disclosure decides the search range of stereo matching from the actual size of the object to be detected, the size of the object on the image, and geometrical information between sensors. Therefore, it is possible to avoid unnecessary searching, to improve the stereo matching performance, and to reduce the amount of calculation.

In addition, the block size of stereo matching is decided from the parameters (the size of the detection window and the resolution of an image in the detection process) of the object detector. Therefore, it is possible to optimize the block size to the object to be detected and to improve the stereo matching performance.

Further, in the stereo matching, a multi-resolution cost volume is generated from a high-resolution cost volume. Therefore, it is possible to reduce a feature amount extraction process before the stereo matching and to efficiently generate a multi-resolution disparity map.

Furthermore, a candidate region in which the existence probability of an object is high is decided on the basis of a score related to the similarity obtained from the result of stereo matching and the classification process in the subsequent stage is performed only for the candidate region. Therefore, it is possible to reduce the amount of calculation of the object detector.

5. For Example of Hardware Configuration of Image Processing Apparatus

Next, an example of the hardware configuration of the image processing apparatus will be described with reference to FIG. 20.

Figure 20:
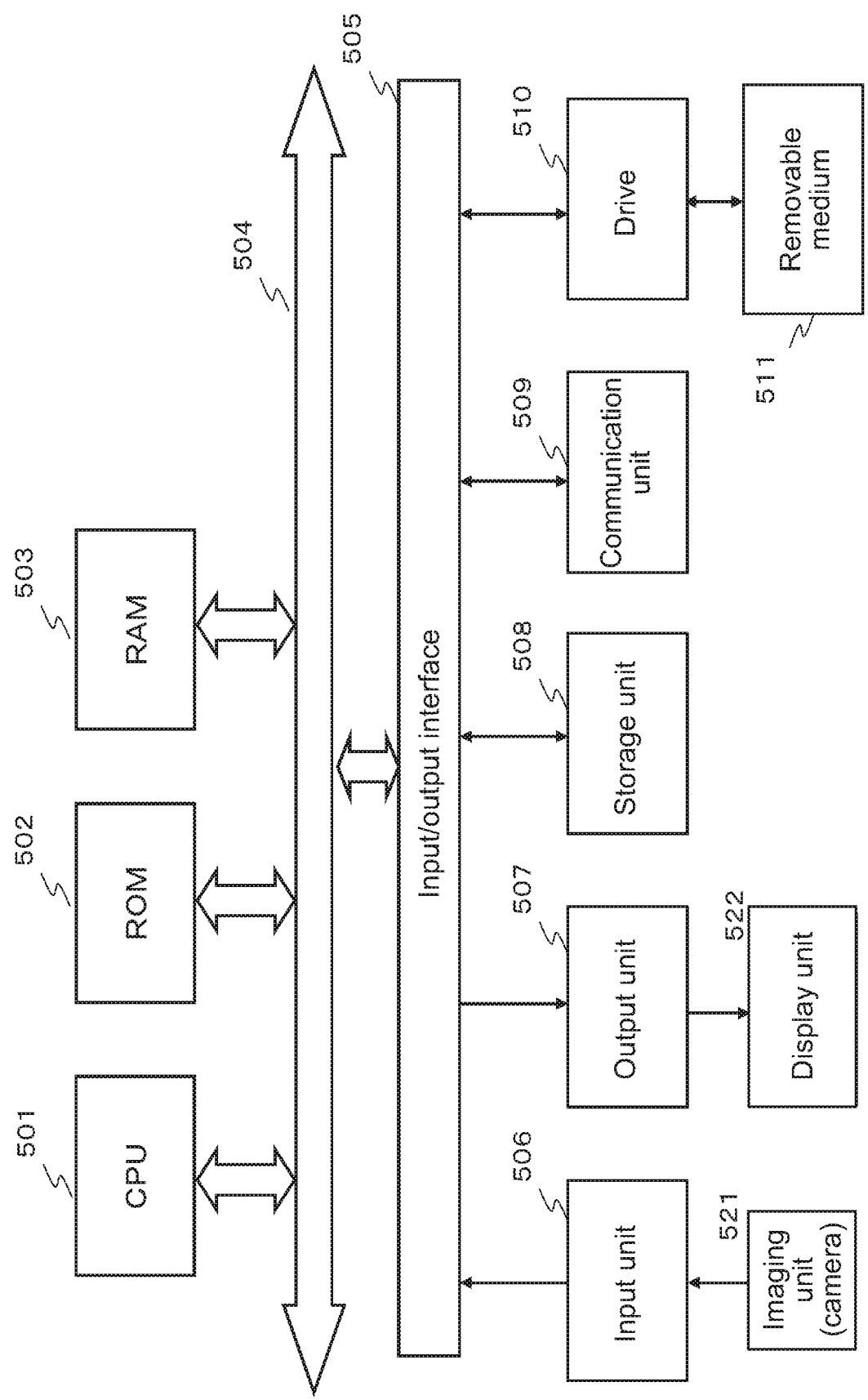

FIG. 20 is a diagram illustrating an example of the hardware configuration of the image processing apparatus that performs the process according to the present disclosure.

A central processing unit (CPU) 501 functions as a control unit or a data processing unit that performs various processes in accordance with a program stored in a read only memory (ROM) 502 or a storage unit 508. For example, the CPU 501 performs the process according to the sequence described in the above-mentioned embodiment. A random access memory (RAM) 503 stores, for example, programs or data executed by the CPU 501. The CPU 501, the ROM 502, and the RAM 503 are connected to each other by a bus 504.

The CPU 501 is connected to an input/output interface 505 through the bus 504. An input unit 506 that inputs an image captured by an imaging unit 521 and includes various switches, a keyboard, a mouse, and a microphone which can be used by the user to input information and an output unit 507 that outputs data to, for example, a display unit 522 or a speaker are connected to the input/output interface 505. The CPU 501 performs various processes in response to commands input from the input unit 506 and outputs the processing results to, for example, the output unit 507.

The storage unit 508 connected to the input/output interface 505 is, for example, a hard disk drive and stores the programs or various types of data executed by the CPU 501. A communication unit 509 functions as a transmitting and receiving unit for Wi-Fi communication, Bluetooth (registered trademark) (BT) communication, and other types of data communication through a network, such as the Internet or a local area network, and communicates with external apparatuses.

A drive 510 connected to the input/output interface 505 drives a removable medium 511, such as a magnetic disk, an optical disk, a magneto-optical disk, or a semiconductor memory such as a memory card, to record or read data.

6. For Summary of Configuration of Present Disclosure

The embodiments of the present disclosure have been described in detail above with reference to the specific embodiments. However, it is obvious that those skilled in the art can make modifications and substitutions of the embodiments without departing from the scope and spirit of the present disclosure. That is, the invention has been disclosed in the form of illustration and should not be construed as being limited to the embodiments. The claims needs be referred to in order to determine the scope of the present disclosure.

It should be noted that the technology disclosed in the specification can have the following configuration.

(1) An image processing apparatus including
an object detection unit that receives two images captured from different viewpoints and performs an object detection process, in which
the object detection unit includes
a disparity calculation unit that calculates a disparity of each pixel of the two images and generates a disparity map including calculated disparity information, and
a classification unit that performs the object detection process using the disparity map generated by the disparity calculation unit, and
the disparity calculation unit generates disparity maps corresponding to a plurality of different resolutions and outputs the disparity maps to the classification unit.

(2) The image processing apparatus according to (1), in which
the disparity calculation unit includes a pixel matching unit that performs a stereo matching process which is a corresponding point search process using original-resolution images of the two images.

(3) The image processing apparatus according to (2), in which
the pixel matching unit decides a search range section which is a corresponding point search region, using at least one of a value of a height L of an object to be detected in the object detection process, a value of a height h of the object on the image, or a value of a baseline length B corresponding to a distance between two cameras which capture the two images.

(4) The image processing apparatus according to (2) or (3), in which
the pixel matching unit generates a cost volume which is a stack of cost planes in which a similarity for each pixel is set to each pixel forming the image as an execution result of the stereo matching process.

(5) The image processing apparatus according to (4), in which
the disparity calculation unit includes a cost volume filtering unit that performs a filtering process for the cost volume generated by the pixel matching unit to generate cost volumes corresponding to a plurality of different resolutions.

(6) The image processing apparatus according to (5), in which the cost volume filtering unit performs the filtering process by changing setting of a step which is a spacing between pixels to be filtered and a kernel size defining a range of reference pixels to be referred to in the filtering process in accordance with the resolution of the cost volume to be output.

(7) The image processing apparatus according to (5) or (6), in which the cost volume filtering unit performs the filtering process using an averaging filter.

(8) The image processing apparatus according to any one of (5) to (7), in which the disparity calculation unit includes a disparity decision unit that generates disparity maps and object candidate region maps which correspond to the cost volumes corresponding to the plurality of different resolutions generated by the cost volume filtering unit.

(9) The image processing apparatus according to (8), in which the disparity decision unit performs a disparity decision process that compares pixel values (similarities) at a same pixel position (corresponding pixel position) in a plurality of cost planes included in a cost volume corresponding to a resolution selected as a processing target to select a cost plane with the highest similarity and decides a disparity d of the selected cost plane as a disparity D of the pixel position and generates a disparity map in which the disparity D decided in the disparity decision process is associated with each pixel.

(10) The image processing apparatus according to (9), in which the disparity decision unit generates an object candidate region map indicating a region (pixel region) in which an existence probability of the object to be detected is high, on the basis of the disparity $D(x, y)$ corresponding to each pixel decided in the disparity decision process or a similarity at the disparity $D(x, y)$.

(11) The image processing apparatus according to any one of (8) to (10), in which the classification unit receives the disparity maps and the object candidate region maps corresponding to the plurality of different resolutions generated by the disparity calculation unit and performs the object detection process, using a machine learning process using input data.

(12) The image processing apparatus according to (11), in which the classification unit performs the object detection process using aggregated channel features (ACF) which are an object detection algorithm.

(13) The image processing apparatus according to any one of (1) to (12), in which the two images captured from the different viewpoints are a visible image and a far-infrared image.

(14) An image processing method to be executed in an image processing apparatus, the image processing method including an object detection processing step of allowing an object detection unit to receive two images captured from different viewpoints and to perform an object detection process, in which the object detection processing step includes a disparity calculation step of allowing a disparity calculation unit to calculate a disparity of each pixel of the two images and to generate a disparity map including calculated disparity information, and a classification processing step of allowing a classification unit to perform the object detection process using the disparity map generated in the disparity calculation step, and in the disparity calculation step, disparity maps corresponding to a plurality of different resolutions are generated and output to the classification unit.

(15) A program that causes image processing to be executed in an image processing apparatus and causes an object detection unit to execute an object detection processing step of receiving two images captured from different viewpoints and executing an object detection process, in which in the object detection processing step, the program causes a disparity calculation unit to execute a disparity calculation step of calculating a disparity of each pixel of the two images and generating a disparity map including calculated disparity information and causes a classification unit to execute a classification processing step of performing the object detection process using the disparity map generated in the disparity calculation step, and in the disparity calculation step, disparity maps corresponding to a plurality of different resolutions are generated and output to the classification unit.

In addition, a series of processes described in the specification may be implemented by hardware, software, or a combination thereof. In a case in which the processes are implemented by software, a program having a processing sequence recorded thereon may be installed in a memory of a computer incorporated into dedicated hardware and then executed, or the program may be installed in a general-purpose computer capable of performing various processes and then executed. For example, the program may be recorded on a recording medium in advance. The program may be installed from the recording medium to the computer. Alternatively, the program may be received by the computer through a network, such as a local area network (LAN) or the Internet, and then installed in a recording medium, such as a hard disk drive, provided in the computer.

It should be noted that the various processes described in the specification are not only performed in time series according to the description, but also may be performed in parallel or individually in accordance with the processing capability of the apparatus performing the processes or if needed. Further, in the specification, the system is a logical set configuration of a plurality of apparatuses and is not limited to the configuration in which the apparatuses are provided in the same housing.

INDUSTRIAL APPLICABILITY

As described above, in accordance with the configuration of one embodiment of the present disclosure, an apparatus and a method that perform generation of a disparity map and an object detection process with high accuracy and efficiency are achieved.

Specifically, for example, the apparatus includes a disparity calculation unit that receives two images captured from different viewpoints, calculates a disparity, and generates a disparity map and a classification unit that performs an object detection process using the disparity map. The disparity calculation unit performs a stereo matching process using an original-resolution image, generates cost volumes corresponding to a plurality of resolutions from the processing result, generates disparity maps and object candidate region maps corresponding to the plurality of different resolutions, using the cost volumes corresponding to each resolution, and outputs the disparity maps and the object candidate region maps to the classification unit.

The apparatus and the method that perform the generation of the disparity map and the object detection process with high accuracy and efficiency are achieved by these processes.

REFERENCE SIGNS LIST 10 visible image
20 far-infrared image
100 image processing apparatus
101 control unit
102 storage unit
103 codec
104 input unit
105 output unit
106 imaging unit
107 visible imaging unit
108 far-infrared imaging unit
111 first imaging element
112 second imaging element
131 first image
132 second image
140 calibration execution unit
151 corrected first image
152 corrected first image
170 object detection result
200 object detection unit
210 feature amount extraction unit
211 first image feature amount
212 second image feature amount
220 disparity calculation unit
221 pixel matching unit
222 cost volume filtering unit
223 disparity decision unit
225 disparity map
226 object region candidate map
230 classification unit
300 cost volume
301 cost plane
501 CPU
502 ROM
503 RAM
504 bus
505 input/output interface
506 input unit
507 output unit
508 storage unit
509 communication unit
510 drive
511 removable medium
521 imaging unit
522 display unit

The invention claimed is:

1. An image processing apparatus, comprising:
circuitry configured to:
receive two images captured from different viewpoints;
determine a search range section which is a corresponding point search region, using at least one of a value of a height L of an object to be detected in an object detection process, or a value of a height h, of the object, on at least one image of the two images;
calculate a disparity of each pixel of the two images based on the determined search range section;
generate a disparity map including the calculated disparity;
generate a cost volume which is a stack of a plurality of cost planes in which a similarity for each pixel is set to each pixel of an image of the two images;
execute a filtering process for the generated cost volume to generate a plurality of cost volumes corresponding to a plurality of different resolutions;
generate object candidate region maps which correspond to the plurality of cost volumes corresponding to the plurality of different resolutions; and
detect the object according to the object detection process based on the generated disparity map and the generated object candidate region maps.

2. The image processing apparatus according to claim 1, wherein the circuitry is further configured to execute a stereo matching process which is a corresponding point search process using original-resolution images of the two images.

3. The image processing apparatus according to claim 2, wherein
the cost volume is an execution result of the stereo matching process.

4. The image processing apparatus according to claim 1, wherein
the circuitry is further configured to execute the filtering process based on change of setting of a step which is a spacing between pixels to be filtered and a kernel size which defines a range of reference pixels to be referred to in the filtering process, and
the step and the kernel size are set based on a resolution of the generated cost volume to be output.

5. The image processing apparatus according to claim 1, wherein the circuitry is further configured to execute the filtering process using an averaging filter.

6. The image processing apparatus according to claim 1, wherein the circuitry is further configured to:
compare similarities of pixel values at corresponding pixel positions in the plurality of cost planes which is included in at least one cost volume, of the plurality of cost volumes, corresponding to at least one resolution selected as a processing target;
select a cost plane from the plurality of cost planes, with a highest similarity of the pixel values at the corresponding pixel positions based on the comparison;
determine a disparity d of the selected cost plane as a disparity D of the pixel position; and
generate the disparity map in which the disparity D is associated with each pixel of the two images.

7. The image processing apparatus according to claim 6, wherein the circuitry is further configured to generate an object candidate region map indicating a pixel region in which an existence probability of the object to be detected is high, based on one of the disparity $D(x, y)$ corresponding to each pixel of the two images or a similarity at the disparity $D(x, y)$.

8. The image processing apparatus according to claim 1, wherein the circuitry is further configured to:
generate disparity maps corresponding to the plurality of different resolutions; and
execute the object detection process, using a machine learning process using input data.

9. The image processing apparatus according to claim 8, wherein the circuitry is further configured to execute the object detection process using aggregated channel features (ACF) which is an object detection algorithm.

10. The image processing apparatus according to claim 1, wherein the two images captured from the different viewpoints are a visible image and a far-infrared image.

11. An image processing method, comprising:
receiving two images captured from different viewpoints;
determining a search range section which is a corresponding point search region, using at least one of a value of a height L of an object to be detected in an object detection process, or a value of a height h, of the object, on at least one image of the two images;
calculating a disparity of each pixel of the two images based on the determined search range section;
generating a disparity map including the calculated disparity;
generating a cost volume which is a stack of a plurality of cost planes in which a similarity for each pixel is set to each pixel of an image of the two images;
executing a filtering process for the generated cost volume to generate a plurality of cost volumes corresponding to a plurality of different resolutions;
generating object candidate region maps which correspond to the plurality of cost volumes corresponding to the plurality of different resolutions; and
detecting the object according to the object detection process based on the generated disparity map and the generated object candidate region maps.

12. A non-transitory computer-readable medium having stored thereon computer-executable instructions which, when executed by a processor, cause the processor to execute operations, the operations comprising:
receiving two images captured from different viewpoints;
determining a search range section which is a corresponding point search region, using at least one of a value of a height L of an object to be detected in an object detection process, or a value of a height h, of the object, on at least one image of the two images;
calculating a disparity of each pixel of the two images based on the determined search range section;
generating a disparity map including the calculated disparity;
generating a cost volume which is a stack of a plurality of cost planes in which a similarity for each pixel is set to each pixel of an image of the two images;
executing a filtering process for the generated cost volume to generate a plurality of cost volumes corresponding to a plurality of different resolutions;
generating object candidate region maps which correspond to the plurality of cost volumes corresponding to the plurality of different resolutions; and
detecting the object according to the object detection process based on the generated disparity map and the generated object candidate region maps.

* * * * *